US012807811B2

(12) United States Patent
Sanseau et al.

(10) Patent No.: US 12,807,811 B2
(45) Date of Patent: Nov. 24, 2026

(54) POLY(ARYLENE SULFIDE) COMPOSITION

(71) Applicant: SYENSQO SPECIALTY POLYMERS USA, LLC, Alpharetta, GA (US)

(72) Inventors: Olivier Sanseau, Lyons (FR); Olivier Bronchart, Communay (FR); Thibaut Marque, Simandres (FR)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 0 days.

(21) Appl. No.: 18/576,464

(22) PCT Filed: Jul. 8, 2022

(86) PCT No.: PCT/EP2022/069036

§ 371 (c)(1),
(2) Date: Jan. 4, 2024

(87) PCT Pub. No.: WO2023/281044

PCT Pub. Date: Jan. 12, 2023

(65) Prior Publication Data

US 2024/0317999 A1 Sep. 26, 2024

(30) Foreign Application Priority Data

Jul. 8, 2021 (EP) .................................... 21315124

(51) Int. Cl.

| | |
|---|---|
| ***C08L 81/02*** | (2006.01) |
| ***B29C 64/314*** | (2017.01) |
| ***B33Y 70/00*** | (2020.01) |
| ***C08K 5/105*** | (2006.01) |
| ***C08K 5/524*** | (2006.01) |
| *B29K 81/00* | (2006.01) |
| *B29K 83/00* | (2006.01) |
| *B29K 96/04* | (2006.01) |
| *B29K 105/00* | (2006.01) |
| *B33Y 40/10* | (2020.01) |

(52) U.S. Cl.

CPC ............ *C08L 81/02* (2013.01); *B29C 64/314* (2017.08); *B33Y 70/00* (2014.12); *C08K 5/105* (2013.01); *C08K 5/524* (2013.01); *B29K 2081/00* (2013.01); *B29K 2083/00* (2013.01); *B29K 2096/04* (2013.01); *B29K 2105/0088* (2013.01); *B33Y 40/10* (2020.01)

(58) Field of Classification Search

None

See application file for complete search history.

(56) References Cited

U.S. PATENT DOCUMENTS

| | | | | |
|---|---|---|---|---|
| 5,324,796 | A | 6/1994 | Han | |
| 5,604,287 | A * | 2/1997 | Yamao | C08L 51/085 524/502 |
| 2006/0229417 | A1 | 10/2006 | Ferrate et al. | |
| 2010/0069557 | A1* | 3/2010 | Moad | C08L 51/08 524/451 |
| 2013/0269977 | A1 | 10/2013 | Luo et al. | |
| 2019/0390015 | A1* | 12/2019 | Jeol | C08J 9/009 |

FOREIGN PATENT DOCUMENTS

| | | | |
|---|---|---|---|
| CN | 109161199 | A | 1/2019 |
| EP | 575089 | A1 | 12/1993 |
| EP | 601781 | A2 | 6/1994 |
| EP | 1452567 | A1 | 9/2004 |
| EP | 1466946 | A1 | 10/2004 |
| EP | 1486536 | A1 | 12/2004 |
| EP | 3127941 | A1 | 2/2017 |
| JP | 2003082122 | A * | 3/2003 |
| WO | WO 2009105527 | A1 | 8/2009 |
| WO | WO 2018178323 | A1 | 10/2018 |
| WO | WO 2021023502 | A1 | 2/2021 |

OTHER PUBLICATIONS (Retrieved from: <https://www.gelest.com/product/DMS-E12/> on May 21, 2025) (Year: 2025).*

Standard ASTM D1238-04—Standard Test Method for Melt Flow Rates of Thermoplastics by Extrusion Plastometer—2004, 13 pages.

* cited by examiner

*Primary Examiner* — Robert S Jones, Jr.
*Assistant Examiner* — Lily K Sloan
(74) *Attorney, Agent, or Firm* — Osha Bergman Watanabe & Burton LLP

(57) ABSTRACT

The present invention relates to a poly(arylene sulfide) composition including a combination of a limited amount of an antioxidant compound and of an epoxy-functional polyorganosiloxane polymer, possessing improved mechanical performances and outstanding thermal ageing resistance, to a process for its manufacturing, as well as to an article, part or composite material comprising said composition, and to the use of this composition for the manufacture of 3D objects

9 Claims, 2 Drawing Sheets

POLY(ARYLENE SULFIDE) COMPOSITION

Figure 1:
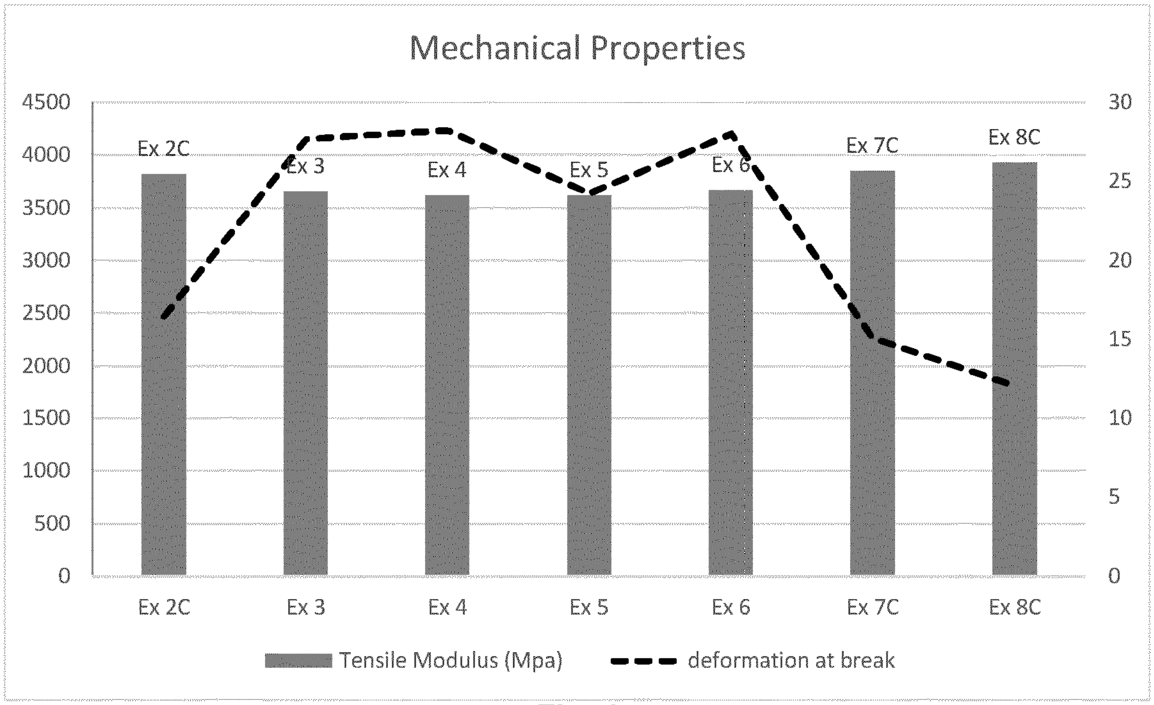

This application is a U.S. national stage entry under 35 U.S.C. § 371 of International Application No. PCT/EP2022/069036 filed on Jul. 8, 2022, which claims priority to a European patent application filed on 8 Jul. 2021 in EUROPE with Nr 21315124.4, the whole content of this application being incorporated herein by reference for all purposes.

TECHNICAL FIELD

The present invention relates to a poly(arylene sulfide) composition, to a process for its manufacturing, as well as to an article, part or composite material comprising said composition, and to the use of this composition for the manufacture of 3D objects.

The present invention relates to a poly(arylene sulfide) composition, to a process for its manufacturing, as well as to an article, part or composite material comprising said composition, and to the use of this composition for the manufacture of 3D objects.

BACKGROUND ART

Poly(arylene sulfide) (PAS) polymers are semi-crystalline thermoplastic polymers having notable mechanical properties, such as high tensile modulus and high tensile strength, and stability towards thermal degradation and chemical reactivity. They are also characterized by excellent melt processing, such as injection molding.

This broad range of properties makes PAS polymers suitable for a large number of applications, for example in the automotive, electrical, electronic, aerospace and appliances markets.

Despite the above advantages, PAS polymers may be too inflexible or stiff for some applications in which a high degree of flexibility, resilience, toughness, or impact resistance are desired. Further, despite their inherent thermal stability, stringent thermal requirements for certain under-the-hood applications may limit their applicability.

For addressing toughness and flexibility, several prior art documents describe the preparation of compatible blends of poly(arylene sulphide) polymers and epoxy-functionalized siloxane polymers. For example, U.S. Pat. No. 5,324,796 describes compositions comprising poly(phenylene sulphide) polymers blended with high molecular weight epoxy-functionalized siloxane polymers, wherein the weight ratio between the siloxane and poly(phenylene sulfide) polymers is 0.1-25:100 and wherein the poly(phenylene sulfide) polymers are branched by heat curing in an oxidative atmosphere.

Other prior art documents describe the modification of the main chain skeleton of the PAS polymer by chemically bonding the poly(arylene sulfide) to a polyorganosiloxane into a copolymer. For example, U.S. Pat. No. 9,840,596 describes a poly(phenylene sulfide) block copolymer containing poly(phenylene sulfide) units of low weight-average molecular weight and polyorganosiloxane units.

On the other side, the use of antioxidants in thermoplastic materials, including PPS, is a common practice, notably when addressing thermal ageing issues. Antioxidants have hence been already proposed in thermoplastic toughened formulations based on PPS, such as in WO2009/105527, whereas toughened blends of PPS, combined with certain other ingredients, were added with antioxidants to provide formulations possessing notably suitable ageing performances for being acceptable as coating conductors for use in under-the-hood automotive and other applications.

As a matter of fact, temperature requirements for materials used under the hood for electric vehicles continues to increase. Consequently, there is a need in the art for a flexible, tough thermoplastic composition with low and high temperature capability, and outstanding thermal stability, for use notably, in under-the-hood applications, particularly in electric vehicles.

SUMMARY OF INVENTION

In a first aspect, the present invention relates to a polymer composition [composition (C)] comprising:

- at least one poly(arylene sulfide) polymer [polymer (PAS)], and
- at least one polyorganosiloxane polymer having at least one epoxy functional group [polymer (POS)]; and
- at least one antioxidant compound [compound (O)], in an amount of 0.03 to 0.4% wt, with respect to the weight of polymer (PAS).

In a second aspect, the present invention relates to a process for preparing said composition (C), said process comprising blending in the molten state:

- at least one poly(arylene sulfide) polymer [polymer (PAS)], and -at least one polyorganosiloxane polymer having at least one epoxy functional group [polymer (POS)]; and -at least one antioxidant compound [compound (O)], in an amount of 0.03 to 0.4% wt, with respect to the weight of polymer (PAS).

In a third aspect, the present invention relates to an article, part or composite material comprising the composition (C) as defined above, for example a cable coating, a cable tie, a metal pipe coating, a molded article, an extruded article or a three-dimensional (3D) object.

In a forth aspect, the present invention relates to the use of the of the composition (C) as defined above for the manufacture of a three-dimensional (3D) object using additive manufacturing, preferably fused deposition modelling (FDM), selective laser sintering (SLS) or multi jet fusion (MJF).

Advantageously, due to the synergistic effect of polymer (POS) and low amount of compound (O), the composition (C) according to the present invention surprisingly shows significantly improved deformation at break compared to either poly(arylene sulfide) polymers which are free from compound (O) or which comprise said compound (O) in higher amounts, and possesses outstanding ageing performances, significantly improved over those of toughened and stabilized compounds, comprising a modifier other than polymer (POS).

DISCLOSURE OF THE INVENTION

For the purposes of the present description:

- the use of parentheses before and after symbols or numbers identifying compounds, chemical formulae or parts of formulae has the mere purpose of better distinguishing those symbols or numbers from the rest of the text and hence said parentheses can also be omitted;
- "melting temperature ($T_m$)" or "$T_m$" or "melting point" is intended to indicate the melting temperature measured by differential scanning calorimetry (DSC) according to ASTM D3418 at 20 °C/min as described in details in the examples;

the term "halogen" includes fluorine, chlorine, bromine, and iodine, unless indicated otherwise;

the adjective "aromatic" denotes any mono- or polynuclear cyclic group (or moiety) having a number of IT electrons equal to 4n+2, where n is 1 or any positive integer; an aromatic group (or moiety) can be an aryl and arylene group (or moiety).

The Poly(arylene sulphide) Polymer [Polymer (PAS)]

The poly(arylene sulfide) ("PAS") polymer comprises recurring units ($R_{PAS1}$) represented by the following formula:

$$[\text{-}Ar_1\text{-}S\text{—}] \qquad (R_{PAS1})$$

wherein $-Ar_1-$ is selected from the group of formulae consisting of:

(a)

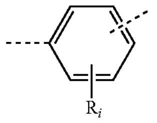

(b)

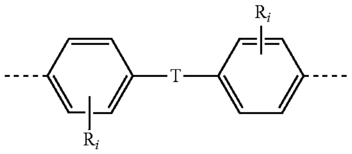

and (c)

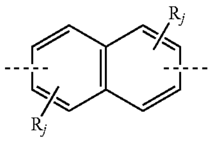

wherein:

R, at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group;

T is selected from the group consisting of a bond, —CO—, —$SO_2$—, —O—, —$C(CH_3)_2$—, —$C(CF_3)_2$—, phenyl and —$CH_2$—;

i, at each instance, is an independently selected integer from 0 to 4;

j, at each instance, is an independently selected integer from 0 to 3.

In formulae (a), (b) and (c), when i or j is zero, the corresponding benzyl rings are unsubstituted. Similar notation is used throughout the present description. Additionally, each formula (a) to (c) contains two dashed bonds, where one bond is to the explicit sulfur atom in the recurring unit ($R_{PAS1}$) and the other is a bond to an atom outside the recurring unit ($R_{PAS1}$) (e.g. an adjacent recurring unit). Analogous notation is used throughout.

Preferably, $-Ar_1-$ is represented by either formula (a) or (b), more preferably by formula (a).

More preferably, $-Ar_1-$ is represented by any of the following formulae:

(a-1)

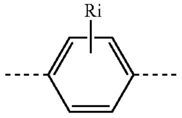

(a-2)

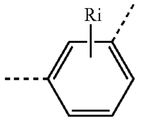

(a-3)

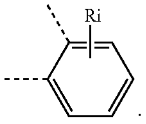

Still more preferably, $-Ar_1-$ is represented by any of formulae (a-1), (a-2) and (a-3), where i is zero.

When units ($R_{PAS1}$) having $-Ar_1-$ of formula (a-1) are present in combination with units whereas $-Ar_1-$ is of any of formulae (a-2) and/or (a-3), the total concentration of recurring units ($R_{PAS1}$) whereas $-Ar_1-$ is of any of formulae (a-2) and (a-3) in the polymer (PAS) is at most 10 mol %, at most 5 mol %, at most 3 mol %, at most 1 mol %, based on total amount of units ($R_{PAS1}$) whereas $-Ar_1-$ is of any of formulae (a-1), (a-2) and (a-3).

Polymer (PAS) having units ($R_{PAS1}$) of formula (a1) where i is zero, as described above, i.e. having units ($R_{PAS1}$) of formula:

($R_{PPS}$)

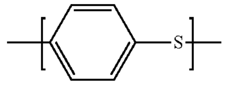

is referred to as poly(phenylene sulfide) (PPS) polymer.

Polymer (PPS) may additionally comprise units of any of formulae:

($R_{PPS-m}$)

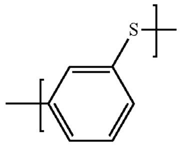

($R_{PPS-o}$)

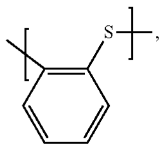

being understood that when polymer (PPS) further comprises units ($R_{PPS-m}$) and/or ($R_{PPS-o}$), the total concentration of recurring units ($R_{PPS-m}$) and/or ($R_{PPS-o}$) in the polymer (PPS) is at most 10 mol %, at most 5 mol %, at most 3 mol %, at most 1 mol %, based on total amount of units ($R_{PPS}$), ($R_{PPS-m}$) and ($R_{PPS-o}$).

In some embodiments, the total concentration of recurring units ($R_{PAS1}$) in the polymer (PAS) is at least 50 mol %, at least 60 mol %, at least 70 mol %, at least 80 mol %, at least 90 mol %, at least 95 mol %, at least 98 mol %, at least 99 mol % or at least 99.9 mol %.

In some embodiments, polymer (PAS) may include recurring units ($R_{PAS2}$) different from recurring units ($R_{PAS1}$), said recurring units ($R_{PAS2}$) being represented by the following formula:

$[-Ar_2-S—]$ ($R_{PAS2}$)

Wherein:

$-Ar_2-$ is represented by the following formula:

(d)

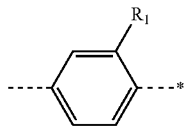

wherein $R_1$ is a $C_1$ to $C_{10}$ linear or branched alkyl group, preferably $R_1$ is $—CH_3$.

In formula (d), the dashed bond having a "*" indicates the bond to the explicit sulfur atom in recurring unit ($R_{PAS2}$) and the dashed bond without the "*" indicates a bond to an atom outside the recurring unit ($R_{PAS2}$). In other terms, in unit ($R_{PAS2}$), the $R_1$ substituent is in ortho position with respect to the —S— moiety.

Of course, in some embodiments, the polymer (PAS) can have additional recurring units, each distinct from each other and distinct from recurring units ($R_{PAS1}$) and ($R_{PAS2}$).

In some embodiments, the total concentration of recurring units ($R_{PAS1}$) and ($R_{PAS2}$) in the polymer (PAS) is at least 50 mol %, at least 60 mol %, at least 70 mol %, at least 80 mol %, at least 90 mol %, at least 95 mol %, at least 98 mol %, at least 99 mol % or at least 99.9 mol %.

As used herein, the molar concentration of recurring units in a polymer is relative to the total number of recurring units in that polymer, unless explicitly stated otherwise.

In some embodiments, the concentration of recurring unit ($R_{PAS1}$) in the polymer (PAS) is at least 50 mol %, at least 60 mol %, at least 70 mol %, at least 80 mol %, at least 85 mol %, at least 88 mol %, at least 90 mol %, at least 95 mol %, at least 97 mol %, at least 98 mol %, at least 98.5 mol %, or at least 99 mol %.

In some embodiments, the concentration of recurring unit ($R_{PAS2}$) in the polymer (PAS) may be of at least 0.5 mol %, at least 1 mol %, at least 1.5 mol %, at least 2 mol % or at least 2.5 mol %. In some embodiments, the concentration of recurring unit ($R_{PAS2}$) is no more than 15 mol %, no more than 12 mol %, no more than 10 mol %, or no more than 8 mol %.

In some embodiments, the number of moles of recurring unit (RPAS2) in the polymer (PAS) may be from 0.5 mol % to 15 mol %, from 0.5 mol % to 12 mol %, from 0.5 mol % to 10 mol %, from 0.5 mol % to 8 mol %, from 1 mol % to 15 mol %, from 1 mol % to 12 mol %, from 1 mol % to 10 mol %, from 1 mol % to 8 mol %, from 2 mol % to 8 mol % or from 2.5 mol % to 8 mol %.

In some embodiments, the ratio of the number of recurring unit ($R_{PAS2}$) to the total number of recurring units ($R_{PAS1}$) and ($R_{PAS2}$) in the polymer (PAS) may be of at least 1 mol %, at least 1.5 mol %, at least 2 mol % or at least 2.5 mol %.

In some embodiments, the ratio of the number of recurring unit ($R_{PAS2}$) to the total number of recurring units ($R_{PAS1}$) and ($R_{PAS2}$) is no more than 15 mol %, no more than 12 mol %, no more than 10 mol %, or no more than 8 mol %.

While polymer (PAS) may comprise units ($R_{PAS2}$), preferred are embodiments whereas polymer (PAS) does not comprise any unit ($R_{PAS2}$), as detailed above. According to these embodiments, the concentration of recurring units ($R_{PAS1}$) in the polymer (PAS) is at least 50 mol %, at least 60 mol %, at least 70 mol %, at least 80 mol %, at least 90 mol %, at least 95 mol %, at least 98 mol %, at least 99 mol % or at least 99.9 mol %.

Most preferably, polymer (PAS) essentially consists of recurring units ($R_{PAS1}$), as detailed above. The expression "essentially consisting", when used for characterising constituent moieties of polymer (PAS) is meant to indicate that minor amounts of spurious units (e.g. less than 0.1 mol %), impurities or chain ends may be present, without this modifying the advantageous attributes of polymer (PAS).

Most preferably, polymer (PAS) is a polymer (PPS), as described above, and most preferably is a polymer (PPS) essentially consisting of units ($R_{PAS1}$) of formula ($R_{PPS}$), as detailed above.

The polymer (PAS) may have a melt flow rate (at 315.6 °C under a weight of 1.27 kg according to ASTM D1238, procedure B) of at most 700 g/10 min, more preferably of at most 500 g/10 min, even more preferably of at most 200 g/10 min, still more preferably of at most 50 g/10 min, yet more preferably of at most 35 g/10 min.

Preferably, the polymer (PAS) has a melt flow rate (at 315.6 °C under a weight of 1.27 kg according to ASTM D1238, procedure B) of at least 1 g/10 min, more preferably of at least 5 g/10 min, even more preferably of at least 10 g/10 min, still more preferably of at least 15 g/10 min.

The polymer (PAS) can be amorphous or semi-crystalline. As used herein, an amorphous polymer has an enthalpy of fusion ("$\Delta H_f$") of no more than 5 Joules/g ("J/g"). The person of ordinary skill in the art will recognize that when the polymer (PAS) is amorphous, it lacks a detectable temperature of melting ($T_m$). Accordingly, where a polymer (PAS) has a $T_m$, the person of ordinary skill in the art will recognize that it refers to semi-crystalline polymer. Preferably, the polymer (PAS) is semi-crystalline. In some embodiments, the polymer (PAS) has a $\Delta H_f$ of at least 10 J/g, at least 20 J/g, at least, or at least 25 J/g. In some embodiments, the polymer (PAS) has a $\Delta H_f$ of no more than 90 J/g, no more than 70 J/g or no more than 60 J/g. In some embodiments, the polymer (PAS) has a $\Delta H_f$ of from 10 J/g to 90 J/g or from 20 J/g to 70 J/g. $\Delta H_f$ can be measured by differential scanning calorimeter (DSC), according to ASTM D3418.

Preferably, the polymer (PAS) has a melting point of at least 240 °C, more preferably of at least 248 °C, even more preferably of at least 250 °C, when determined by differential scanning calorimeter (DSC) according to ASTM D3418.

Preferably, the polymer (PAS) has a melting point of at most 320 °C, more preferably of at most 300 °C, even more preferably of at most 295 °C, when determined by differential scanning calorimeter (DSC) according to ASTM D3418.

Preferably, the polymer (PAS) has a weight-average molecular weight (Mw) of at least 40,000 g/mol, preferably 45,000 g/mol, more preferably of at least 50,000 g/mol, even more preferably of at least 55,000 g/mol, as determined by gel permeation chromatography.

Preferably, the polymer (PAS) has a weight-average molecular weight (Mw) of at most 120,000 g/mol, more preferably of at most 110,000 g/mol, even more preferably of at most 100,000 g/mol, still more preferably of at most 90,000 g/mol, as determined by gel permeation chromatography.

Preferably, the polymer (PAS) is such that it exhibits, as a main technical feature, a calcium content of less than 200 ppm, as measured by X-ray Fluorescence (XRF) analysis calibrated with standards of known calcium content as determined by Inductively Coupled Plasma Optical Emission Spectrometry (ICP-OES) according to ASTM UOP714-07.

Exemplary polymers (PAS) are commercially available as RYTON® PPS from Solvay Specialty Polymers USA, L.L.C.

The polymer (PAS) may advantageously comprise at least one functional group at least one of its chain ends. According to some embodiments, the polymer (PAS) has functional groups at each end of its chain. As used herein, the term "chain" is intended to denote the longest series of covalently bonded atoms that together create a continuous chain in a molecule.

When present, preferably, the functional groups of polymer (PAS) are according to formula (I) below:

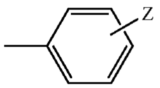

(I)

wherein Z is selected from the group consisting of halogen atoms (e.g. chlorine), carboxyl group, amino group, hydroxyl group, thiol group, acid anhydride group, isocyanate group, amide group, and derivatives thereof such as salts of sodium, lithium, potassium, calcium, magnesium, zinc.

When present, preferably, the functional groups exhibit reactivity towards the polymer (POS), and they are selected from the group consisting of carboxyl group, amino group, hydroxyl group, thiol group, acid anhydride group, isocyanate group, amide group, and derivatives thereof such as salts of sodium, lithium, potassium, calcium, magnesium, zinc.

Preferably, the functional groups are selected from the group consisting of hydroxyl group, thiol group, hydroxylate and thiolate.

Preferably, the polymer (PAS) is linear.

When functional groups are present, preferably, the polymer (PAS) is linear and comprises at least one reactive functional group at least one chain end. In an embodiment, the polymer (PAS) is linear and comprises at least one reactive functional group at each end of its chain.

The Polyorganosiloxane (POS) Polymer Having at Least One Epoxy Functional Group [Polymer (POS)]

The polymer (POS) is a polyorganosiloxane polymer; the expression "polyorganosiloxane" is hereby used according to its usual meaning, that is to say to designate a polymer comprising a sequence of recurring units, whereas said recurring units comprise an organo-substituted catenary silicium atom bound to a catenary oxygen atom.

Said polymer (POS) comprises at least one epoxy or amine functional group: it may comprise only one of said epoxy or amine functional groups, or it may comprise a plurality thereof. Further, said at least one epoxy or amine functional group may be comprised in polymer (POS) as a pendant group in a recurring unit (e.g. as substituent on a organo group bonded to a catenary silicium atom), or may be comprised as chain end.

Within the context of the present invention, the expression "amine functional group" when used in connection with polymer (POS) is intended to encompass groups of formula $-NR_{am1}R_{am2}$, with each of $R_{am1}$ and $R_{am2}$ being H or an hydrocarbon group, preferably at least one of $R_{am1}$ and $R_{am2}$ being H, most preferably both $R_{am1}$ and $R_{am2}$ being H, that is to say, amine group being of formula $-NH_2$.

Similarly, the expression "epoxy functional group" is hereby used according to its usual meaning, i.e. designating a functional group including an oxygen atom joined by single bonds to two adjacent carbon atoms, thus forming a three-membered epoxide ring; in particular the epoxy functional group encompasses notably groups of formula:

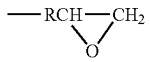

with R being H or $CH_3$.

The polymer (POS) generally complies with formula (II):

(II)

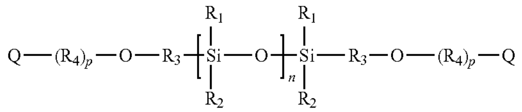

wherein:

each of Q, equal to or different from each other, is one group selected from the group consisting of epoxy groups and amine groups, preferably an epoxy group, or a group selected from $C_1$-$C_{10}$ alkyl groups and $C_6$-$C_{10}$ aromatic groups, with the provisio that at least one Q is one group selected from the group consisting of epoxy groups and amine groups, preferably is an epoxy group;

$R_1$, $R_2$, $R_3$ and $R_4$, equal to or different from each other, are selected from $C_1$-$C_{10}$ alkyl groups and $C_6$-$C_{10}$ aromatic groups, n varies between 2 and 70, preferably between 2 and 60, and p is zero or 1.

Preferably, $R_1$ and $R_2$, equal to or different from each other, represent an alkyl group such as methyl, ethyl, or propyl, or an aromatic group such as phenyl or naphthyl. Preferably, $R_3$ and $R_4$ are alkylene groups such as methylene, ethylene, or propylene, or aromatic groups such as phenylene.

According to certain preferred embodiments, the polymer (POS) is a polydimethylsiloxane (PDMS) polymer, wherein $R_1$ and $R_2$ are methyl groups, $R_3$ is a propylene group, p is 1 and $R_4$ is a methylene group.

According to these embodiments, the polymer (POS) generally complies with formula (III):

(III)

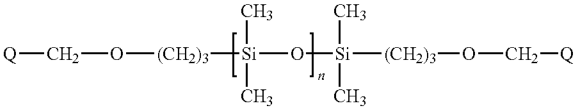

wherein:

each of Q, equal to or different from each other, is a group selected from the group consisting of epoxy groups and amine groups, preferably an epoxy group, or a group selected from $C_1$-$C_{10}$ alkyl groups and $C_6$-$C_{10}$ aromatic groups, with the provisio that at least one Q is group selected from the group consisting of epoxy groups and amine groups, preferably an epoxy group, preferably is an epoxy group; and n varies between 2 and 70, preferably between 2 and 60.

According to preferred embodiments, in polymer (POS), according to both formulae sketched above, each of Q is an epoxy groups, that is to say that in said polymer (POS) each chain end is an epoxy group.

According to preferred embodiments, the polymer (POS) has a weight-average molecular weight (Mw) of at most 5,000 g/mol, at most 4,800 g/mol, at most 4,500 g/mol, at most 4,000 g/mol, at most 3,000 g/mol, at most 2,000 g/mol, at most 1,200 g/mol, as determined by gel permeation chromatography.

According to different embodiments, the polymer (POS) has a weight-average molecular weight (Mw) of at least 200 g/mol, at least 300 g/mol, at least 400 g/mol, as determined by gel permeation chromatography.

Compound (O)

The composition (C) comprises one or more than one organic anti-oxidant, hereby referred to as 'compound (O)'.

Compounds (O), when used in the composition (C) are generally selected from the group consisting of hindered amine compounds, hindered phenol compounds, and phosphorous compounds.

The expression "hindered amine compound" is used according to its customary meaning in this field and generally intended to denote derivatives of 2,2,6,6-tetramethyl piperidine well known in the art (see for example: *Plastics Additives Handbook,* 5th ed., Hanser, 2001). The hindered amine compound of the composition according to the present invention may either be of low or high molecular weight.

Generally, the hindered amine compound used in the present invention comprises at least one piperidine moiety possessing alkyl substituents in alpha position to the amine group; generally the compound comprises at least one tetraalkylpiperidine, preferably a tetramethylpiperidine group.

The hindered amine compounds of low molecular weight have typically a molecular weight of at most 900, preferably at most 800, more preferably of at most 700, still more preferably at most 600 and most preferably of at most 500 g/mol.

Examples of low molecular weight hindered amine compounds are listed in Table 1 below:

TABLE 1

| Formula | |
|---|---|
| (ha1) | 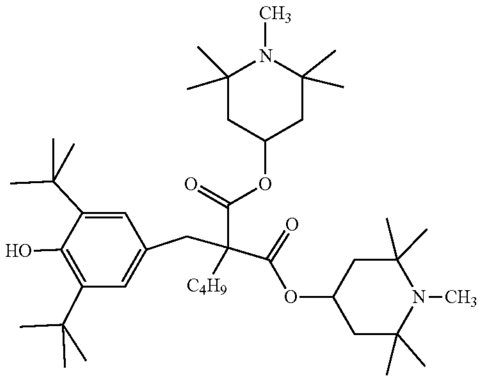 |
| (ha2) | 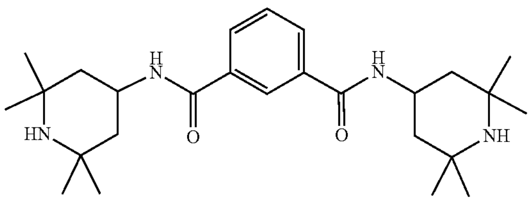 |

TABLE 1-continued
| Formula | |
|---|---|
| (ha3) | 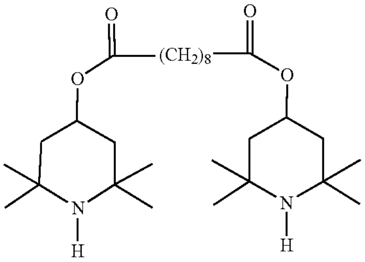 |
| (ha4) | 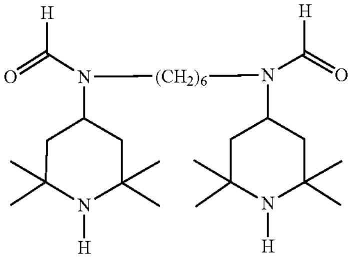 |
| (ha5) | 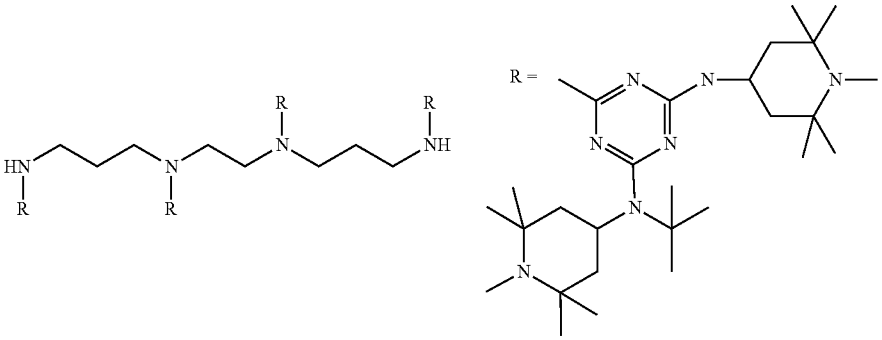 |
| (ha6) | 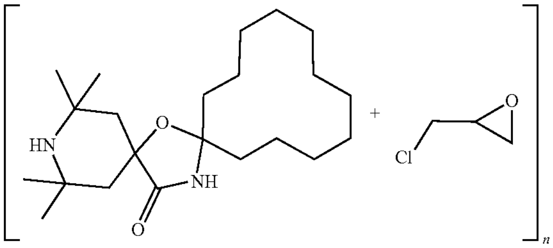 |
| (ha7) | 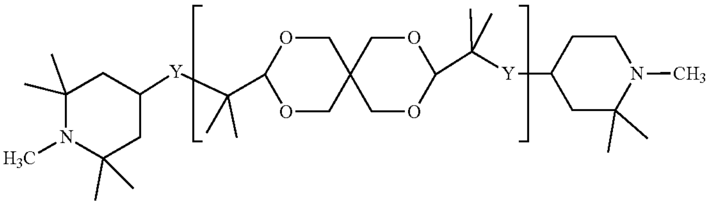 |

TABLE 1-continued
| Formula |
| --- |
| Y = 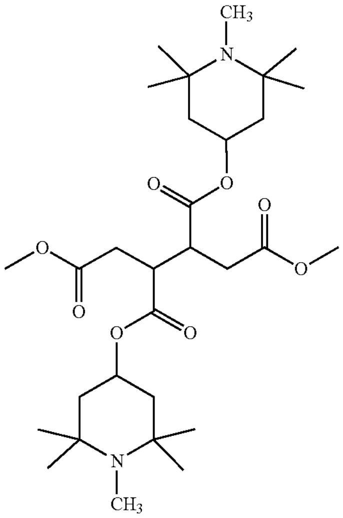 |
| (ha8) 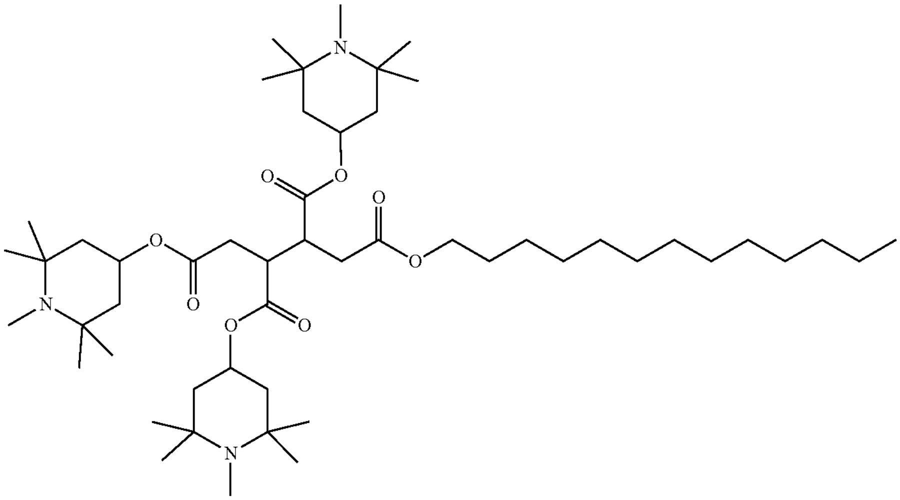 |
| (ha9) 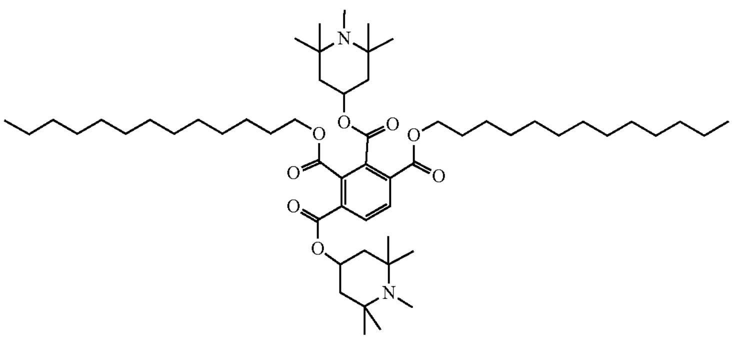 |

TABLE 1-continued

| Formula | |
|---|---|
| (ha10) | 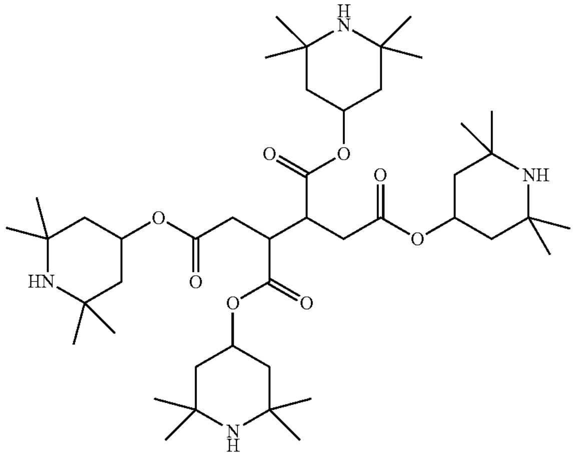 |
| (ha11) | 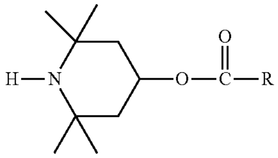 R = $C_{16}$—$C_{18}$ |
| (ha12) | 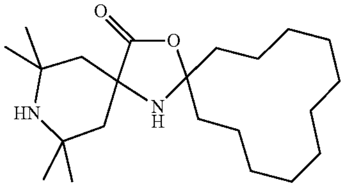 [SMILES: CC1(C)CC2(CC(C)(C)N1)NC1(CCCCCCCCCCC1)OC2=O] |

Among those low molecular weight compounds, the hindered amine is preferably selected from the group consisting of the ones corresponding to formula (ha1), (ha2), (ha11) and (ha12). More preferably, the hindered amine is selected from the group consisting of the ones corresponding to formula (ha1), (ha2), and (ha12). Still more preferably, the hindered amine is the one corresponding to formula (ha2).

The hindered amine compounds of high molecular weight are typically polymeric and have typically a molecular weight of at least 1000, preferably at least 1100, more preferably of at least 1200, still more preferably at least 1300 and most preferably of at least 1400 g/mol.

Examples of high molecular weight hindered amine compounds are listed in Table 2 below:

TABLE 2

| Formula | |
|---|---|
| (hb1) | 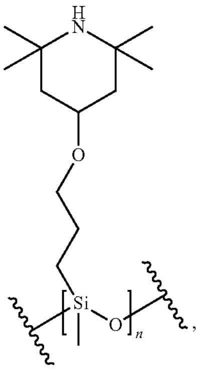 |

TABLE 2-continued
| Formula | |
|---|---|
| (hb2) | 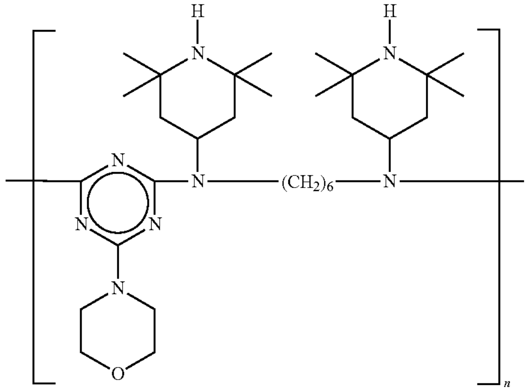 |
| (hb3) | 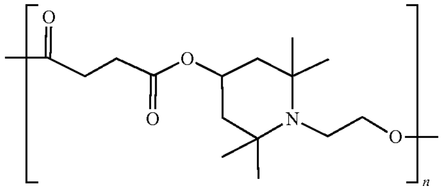 |
| (hb4) | 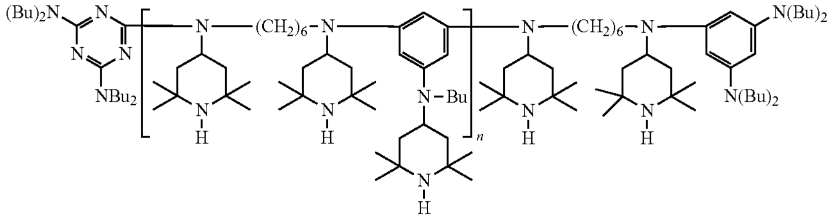 |
| (hb5) | 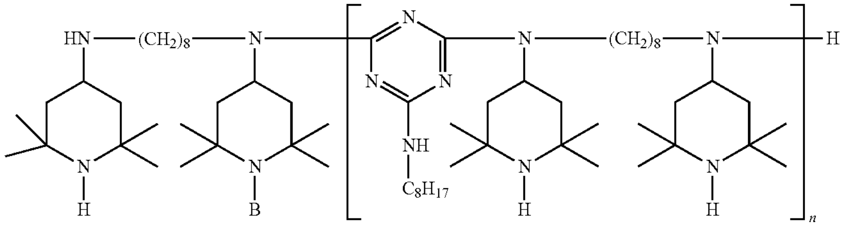 |
| (hb6) | 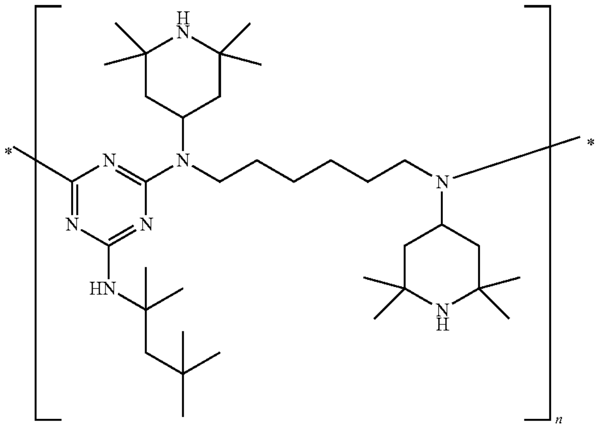 |

The "n" in the formulas (hb1) to (hb6) of Table 2 indicates the number of repeating units in the polymer and is usually an integral equal or greater than 4.

Among those high molecular weight compounds, the hindered amine is preferably selected from the group consisting of the ones corresponding to formula (hb2) and (hb5). More preferably, the high molecular weight hindered amine is the one corresponding to formula (hb2).

The expression "hindered phenol compound" is used according to its customary meaning in this field and generally intended to denote any derivative of ortho-substituted phenols, especially (but not limited to) di-tert-butyl-phenol derivatives, well known in the art Examples of hindered phenol compounds are listed in Table 3 below:

TABLE 3

| | |
|---|---|
| (d1) tetrakis [methylene-3-(3,5-di-tert-butyl-4-hydroxyphenyl-propionate)] methane, commercially available notably as Irganox ® 1010 stabilizer from BASF | 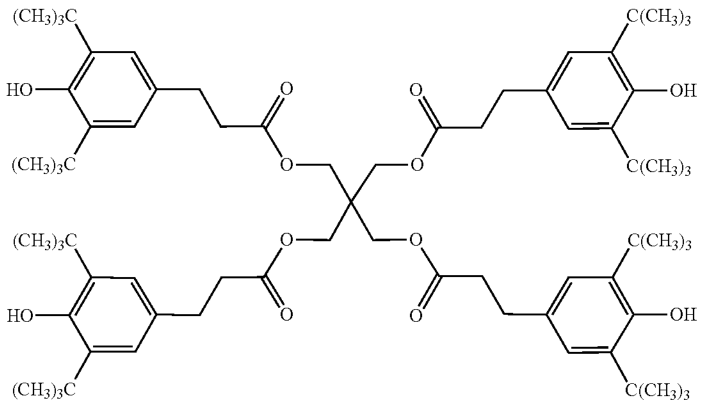 |
| (d2) Thiodiethylene bis[3-(3,5-di-tert.-butyl-4-hydroxy-phenyl)propionate], commercially available notably as Irganox ® 1035 stabilizer from BASF | 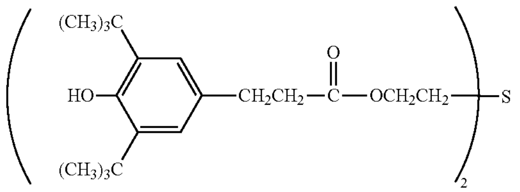 |
| (d3) Octadecyl-3-(3,5-di-tert.butyl-4-hydroxyphenyl)-propionate, commercially available notably as Irganox ® 1076 stabilizer from BASF | 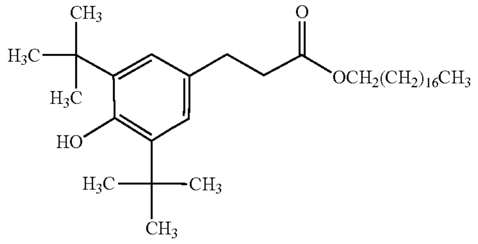 |
| (d4) N,N'-hexane-1,6-diylbis(3-(3,5-di-tert.-butyl-4-hydroxyphenylpropionamide)), commercially available notably as Irganox ® 1098 stabilizer from BASF | 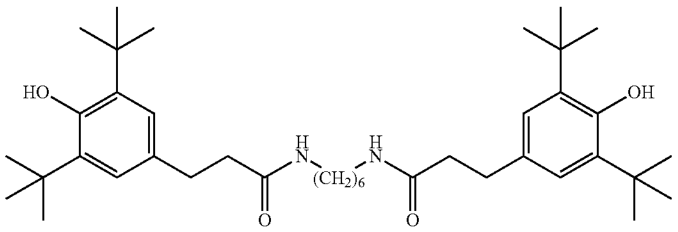 |

TABLE 3-continued (d5)
1,3,5-Trimethyl-2,4,6-tris(3,5-di-tert-butyl-4-hydroxybenzyl)benzene, commercially available notably as Irganox ® 1330 stabilizer from BASF

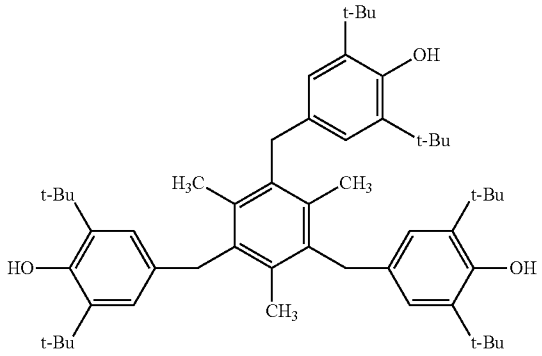 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

(d6)
Benzenepropanoic acid, 3,5-bis(1,1-dimethylethyl)-4-hydroxy-, C7-C9 branched alkyl esters, commercially available notably as Irganox ® 1135 stabilizer from BASF

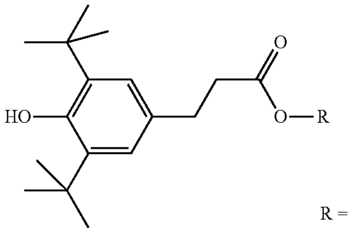

R = C7-C9 branched alkyl (d7)
Hexamethylene bis[3-(3,5-di-tert-butyl-4-hydroxyphenyl)propionate], commercially available notably as Irganox ® 259 stabilizer from BASF

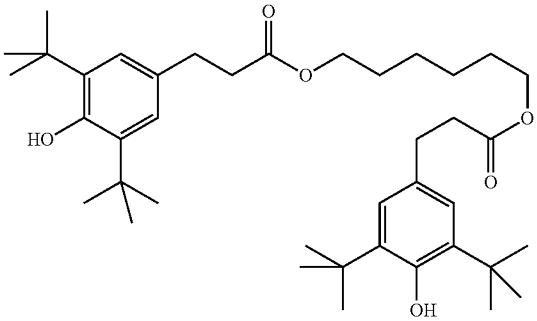 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

(d8)
Tris(3,5-di-tert-butyl-4-hydroxybenzyl) isocyanurate, commercially available notably as Irganox ® 3114 stabilizer from BASF

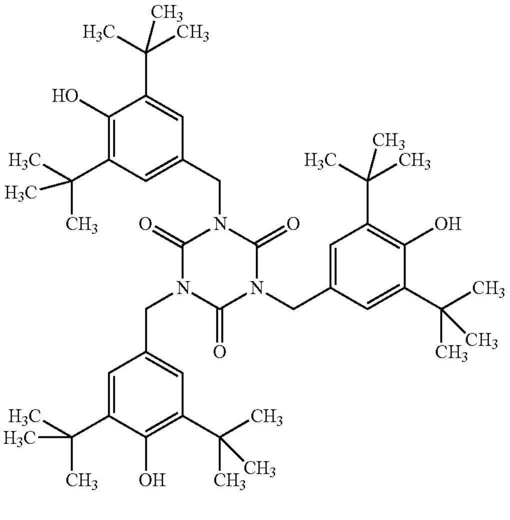 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE 3-continued

| | |
|---|---|
| (d9) 2,6-di-tert-butyl-4-(4,6-bis(octylthio)-1,3,5-triazin-2-ylamino)phenol, commercially available notably as Irganox ® 565 stabilizer from BASF | 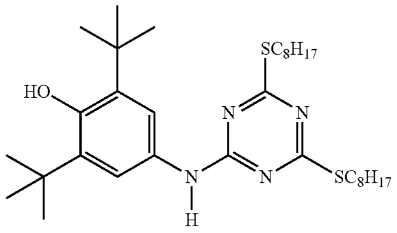 |
| (d10) commercially available notably as Irganox ® 1425 stabilizer from BASF | 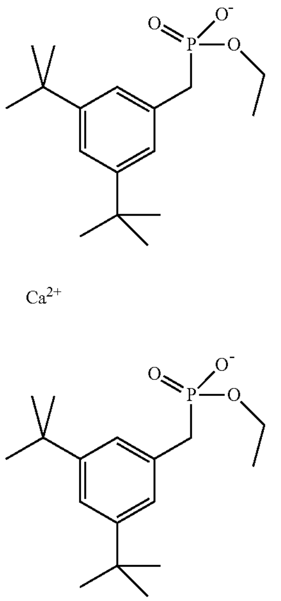 |
| (d11) 2-Methyl-4,6-bis(octylsulfanylmethyl)phenol, commercially available notably as Irganox ® 1520 stabilizer from BASF | 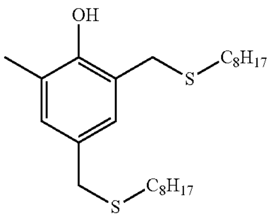 |
| (d12) 2,4-Bis(dodecylthiomethyl)-6-methylphenol, commercially available notably as Irganox ® 1726 stabilizer from BASF | 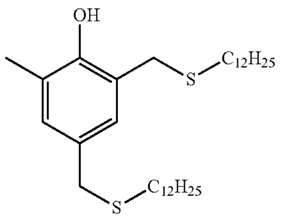 |
| (d13) Triethylene glycol bis(3-tert-butyl-4-hydroxy-5-methylphenyl)propionate, commercially available notably as Irganox ® 245 stabilizer from BASF | 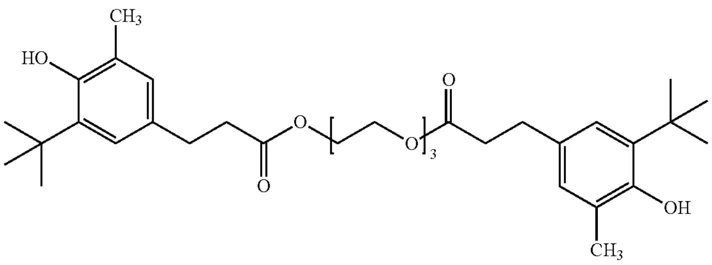 |

A hindered phenol compound which has been found particularly effective in the composition (C) is tetrakis(3-(3,5-di-tert-butyl-4-hydroxyphenyl)propionate) of formula (d1), as above specified.

The compound (O) may be at least one organic phosphorous compound selected from the group consisting of phosphite esters, phosphonites and mixtures thereof.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table 4 below:

TABLE 4

| Formula | |
|---|---|
| (e1) | 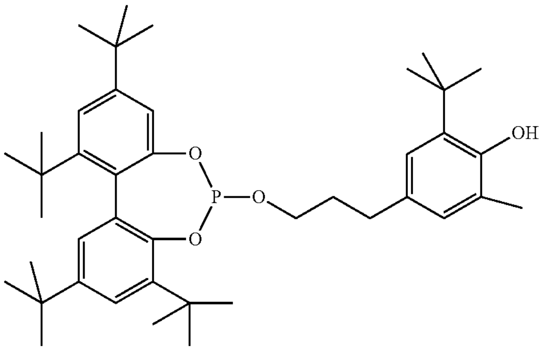 [SMILES: Cc1cc(CCCOp2oc3cc(C(C)(C)C)cc(C(C)(C)C)c3c3cc(C(C)(C)C)cc(C(C)(C)C)c3o2)cc(C(C)(C)C)c1O] |
| (e2) | 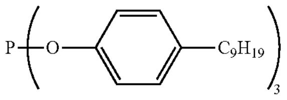 |
| (e3) Tris(2,4-di-tert.-butylphenyl)phosphite, commercially available as IRGAFOS ® 168 | 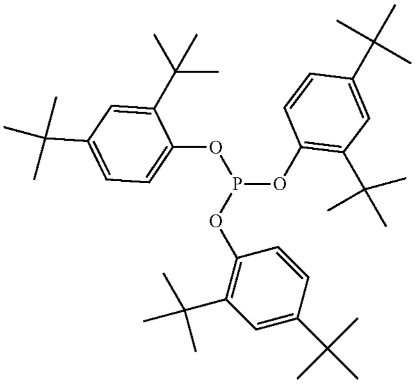 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1] |
| (e4) | 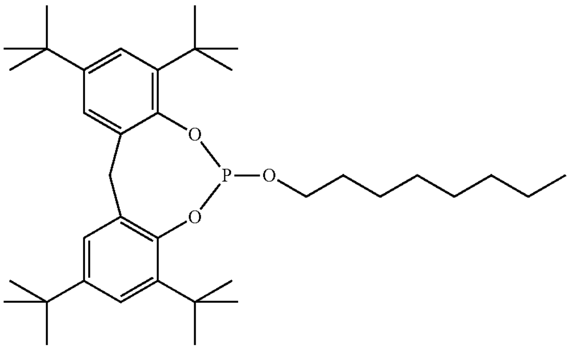 [SMILES: CCCCCCCCOP1Oc2c(cc(C(C)(C)C)cc2C(C)(C)C)Cc2cc(C(C)(C)C)cc(C(C)(C)C)c2O1] |

TABLE 4-continued
| Formula | |
|---|---|
| (e5) Bis(2,4-di-tert-butylphenol)pentaerythritol diphosphate, commercially available as IRGAFOS ® 126 | 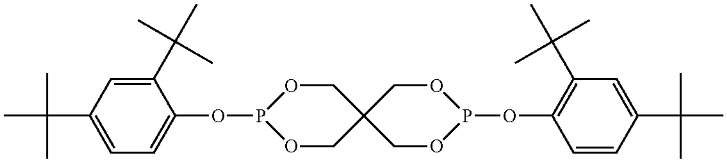 [SMILES: CC(C)(C)c1ccc(OP2OCC3(CO2)COP(Oc2ccc(C(C)(C)C)cc2C(C)(C)C)OC3)c(C(C)(C)C)c1] |
| (e6) Bis(2,6-di-ter-butyl-4-methylphenyl) pentaerythritol-diphosphite, commercially available as ADK STAB PEP-36 from Adeka | 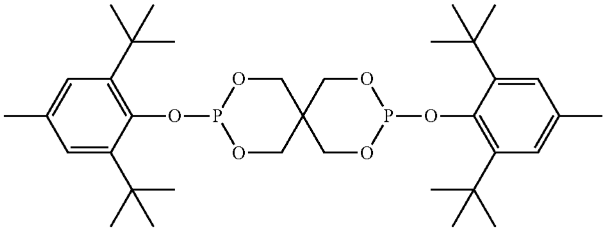 |
| (e7) | 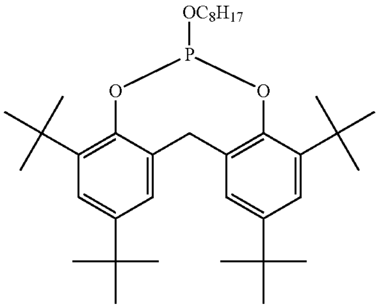 |
| (e8) bis(2,4-di-tert-butyl-6-methyl phenyl) ethyl phosphite, commercially available as IRGAFOS ® 38 | 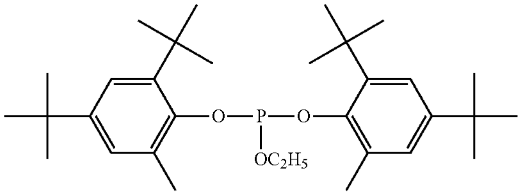 [SMILES: CCOP(Oc1c(C)cc(C(C)(C)C)cc1C(C)(C)C)Oc1c(C)cc(C(C)(C)C)cc1C(C)(C)C] |
| (e9) | 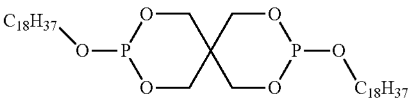 |
| (e10) | 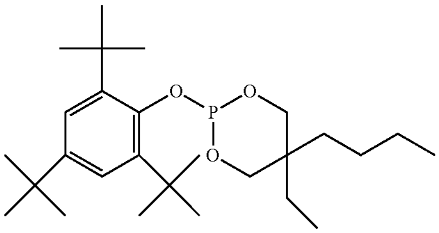 [SMILES: CCCCC1(CC)COP(Oc2c(C(C)(C)C)cc(C(C)(C)C)cc2C(C)(C)C)OC1] |

TABLE 4-continued
| Formula | |
|---|---|
| (e11) | 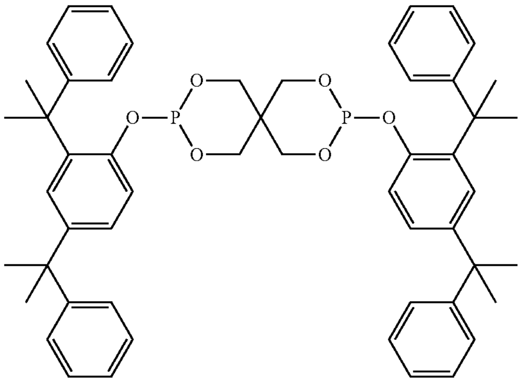 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1] |
| (e12) Bis(2,4,6-tri-ter-butyllphenyl)pentaerythritol-di-phosphite | 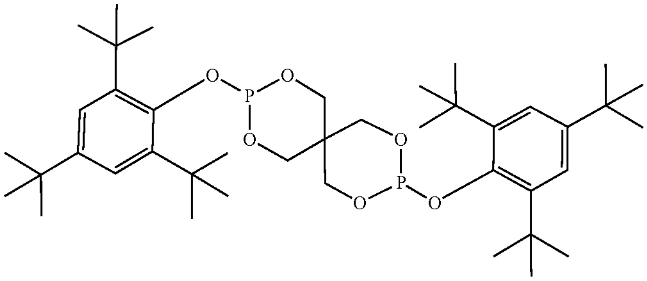 [SMILES: CC(C)(C)c1cc(C(C)(C)C)c(OP2OCC3(CO2)COP(Oc2c(C(C)(C)C)cc(C(C)(C)C)cc2C(C)(C)C)OC3)c(C(C)(C)C)c1] |
Preferred phosphite ester is compound (e3).
Examples of phosphonites are listed in the table 5 below:
TABLE 5
| Formula | Structure |
|---|---|
| (f1) | 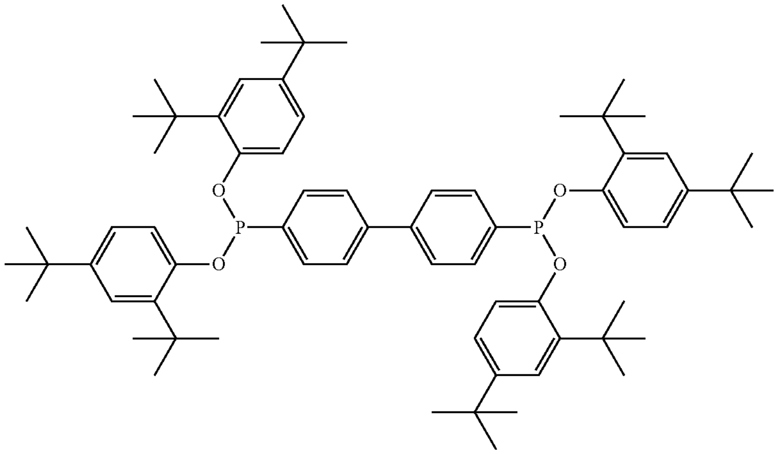 [SMILES: CC(C)(C)c1ccc(OP(Oc2ccc(C(C)(C)C)cc2C(C)(C)C)c2ccc(-c3ccc(P(Oc4ccc(C(C)(C)C)cc4C(C)(C)C)Oc4ccc(C(C)(C)C)cc4C(C)(C)C)cc3)cc2)c(C(C)(C)C)c1] |

TABLE 5-continued

| Formula | Structure |
| --- | --- |
| (f2) | 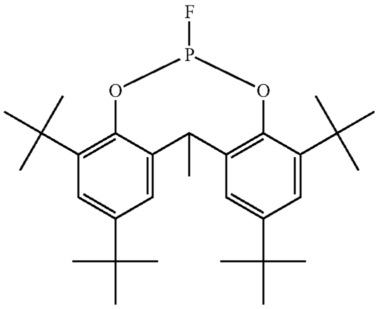 [SMILES: CC1c2cc(C(C)(C)C)cc(C(C)(C)C)c2OP(F)Oc2c1cc(C(C)(C)C)cc2C(C)(C)C] |

As said, compounds (O) are generally selected from the group consisting of hindered amine compounds, hindered phenol compounds, and phosphorous compounds selected from the group consisting of phosphite esters, phosphonites and mixtures thereof.

Preferably, the compound (O) is selected from the group consisting of hindered phenol compounds, and phosphite esters represented by the formula $P(OR)_3$, wherein each of R, can be the same or different and is independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

More preferably, the compound (O) is selected from the group consisting of:

- hindered phenol compounds selected from the group consisting of (d1) tetrakis [methylene-3-(3,5-di-tert-butyl-4-hydroxyphenyl-propionate)] methane (aka e.g. Irganox® 1010), (d2) thiodiethylene bis[3-(3,5-di-tert.-butyl-4-hydroxy-phenyl)propionate] (aka e.g. Irganox® 1035), (d3) Octadecyl-3-(3,5-di-tert.butyl-4-hydroxyphenyl)-propionate (aka e.g. Irganox® 1076), and (d4) N,N'-hexane-1,6-diylbis(3-(3,5-di-tert.-butyl-4-hydroxyphenylpropionamide)) (aka e.g. Irganox® 1098); and
- phosphite esters selected from the group consisting of (e3) Tris(2,4-di-tert.-butylphenyl)phosphite (aka e.g. IRGAFOS® 168); (e5) Bis(2,4-di-tert-butylphenol) pentaerythritol diphosphate (aka e.g. IRGAFOS® 126); (e6) Bis(2,6-di-ter-butyl-4-methylphenyl)pentaerythritol-diphosphite (aka e.g. ADK STAB PEP-36); (e8) bis(2,4-di-tert-butyl-6-methyl phenyl) ethyl phosphite (aka e.g. IRGAFOS® 38).

More preferably, the compound (O) is selected from the group consisting of:

- (d4) N,N'-hexane-1,6-diylbis(3-(3,5-di-tert.-butyl-4-hydroxyphenylpropionamide)) (aka e.g. Irganox® 1098); and
- (e3) Tris(2,4-di-tert.-butylphenyl)phosphite (aka e.g. IRGAFOS® 168).

Composition (C) and Method for its Manufacturing

As already said, the present invention also relates to a composition (C) comprising the poly(arylene sulfide) (PAS), the polymer (POS), the compound (O), as described above.

The polymer (POS) is generally comprised in the composition (C) in an amount of at least 0.5% wt., preferably at least 0.8% wt., more preferably at least 1.0% wt., with respect to the weight of polymer (PAS). Further, the polymer (POS) is generally comprised in the composition (C) in an amount of at most 5.0% wt., preferably at most 4.0% wt., more preferably at most 3.0% wt., with respect to the weight of polymer (PAS).

Particularly good results were obtained with compositions (C) comprising from 1.0 to 2.5% wt. of polymer (POS), with respect to the weight of polymer (PAS).

As said, the composition (C) comprises at least one antioxidant compound [compound (O)], in an amount of 0.03 to 0.4% wt, with respect to the weight of polymer (PAS).

The compound (O) is generally comprised in the composition (C) in an amount of at least 0.04% wt., preferably at least 0.05% wt., with respect to the weight of polymer (PAS). Further, the compound (O) is generally comprised in the composition (C) in an amount of at most 0.40% wt., preferably at most 0.35% wt., more preferably at most 0.30% wt., with respect to the weight of polymer (PAS).

As explained, the amount of compound (O) is critical, when combined with polymer (POS) in composition (C) for obtaining the advantageous synergetic effect of outstanding toughness combined with ageing resistance.

Composition (C) generally comprise polymer (PAS) as major polymer component. While the overall amount of polymer (PAS) in the composition may vary, depending notably on the presence of additional ingredients, such as fillers, it is nonetheless understood that polymer (PAS) will represent at least 80% wt., preferably at least 90% wt., more preferably at least 95% wt., with respect to the combined weight of polymer (PAS), polymer (POS) and compound (O). Upper amount will be solely limited by the mandatory presence of polymer (POS) and compound (C), and hence will not generally go beyond 99% wt., with respect to the combined weight of polymer (PAS), polymer (POS) and compound (O).

As said composition (C) may optionally comprise at least one filler in an amount up to 60 wt. %, based on the total weight of the composition (C).

The composition may also comprise at least one additional additive, for example in an amount of less than 10 wt. %, said additive being selected from the group consisting of colorants, dyes, pigments, lubricants, plasticizers, flame retardants, nucleating agents, processing aids, fusing agents, electromagnetic absorbers and combinations thereof, wherein the wt. % is based on the total weight of the composition (C).

According to various embodiments of the invention, said at least one filler is present in the composition (C) in an amount of at least 5 wt. %, at least 10 wt. %, at least 15 wt. %, at least 20 wt. %, based on the total weight of the composition (C).

According to various embodiments of the invention, said at least one filler is present in the composition (C) in an amount of at most 60 wt. %, at most 55 wt. %, at most 50 wt. %, at most 45 wt. %, based on the total weight of the polymer composition (C).

According to various embodiments of the invention, said at least one additional additive may be present in the composition (C) in an amount of less than 5 wt. %, less than 4 wt. %, less than 3 wt. %, less than 2 wt. %, less than 1 wt. %, based on the total weight of the composition (C).

Said filler may be a reinforcing agent selected from the group consisting of fibrous reinforcing fillers, particulate reinforcing fillers and mixtures thereof. A fibrous reinforcing filler is considered herein to be a material having length, width and thickness, wherein the average length is significantly larger than both the width and the thickness. Generally, a fibrous reinforcing filler has an aspect ratio, defined as the average ratio between the length and the largest of the width and the thickness of at least 5, at least 10, at least 20 or at least 50.

Fibrous reinforcing fillers include glass fibers, carbon or graphite fibers, and fibers formed of silicon carbide, alumina, titania, boron and the like, and may include mixtures comprising two or more such fibers. Non-fibrous reinforcing fillers include notably talc, mica, titanium dioxide, calcium carbonate, potassium titanate, silica, kaolin, chalk, alumina, mineral fillers, and the like.

Preferably, said at least one filler is a fibrous reinforcing filler. Among fibrous reinforcing fillers, glass fibers and carbon fibers are preferred. According to a preferred embodiment of the invention, said composition (C) comprises up to 60 wt. % of glass fibers and/or carbon fibers, for example from 30 to 40 wt. %, based on the total weight of the composition (C).

Process of Making Composition (C)

In a second aspect, the present invention relates to a process for preparing the composition (C), as described above, said process comprising blending in the molten state:

- at least one poly(arylene sulfide) polymer [polymer (PAS)], and
- at least one polyorganosiloxane polymer having at least one epoxy functional group [polymer (POS)]; and
- at least one antioxidant compound [compound (O)], in an amount of 0.03 to 0.4% wt, with respect to the weight of polymer (PAS).

All embodiments described above in connection with composition (C) are applicable here, mutatis mutandis.

Said blending in the molten state can be performed by melt compounding, notably in continuous or batch devices. Such devices are well known to those skilled in the art.

Examples of suitable continuous devices to melt compound the composition (C) are screw extruders. Preferably, melt compounding is carried out in a twin-screw extruder.

If the composition (C) comprises a fibrous reinforcing filler having a long physical shape (e.g. a long glass fiber), drawing extrusion molding may be used to prepare a reinforced composition.

It is also acknowledged that during the said blending in the molten state, polymer (POS) may at least partially react with polymer (PAS), possibly creating block copolymer structures, including blocks derived from polymer (POS) and blocks derived from polymer (PAS). Such reactivity may be enhanced in case polymer (PAS) comprise reactive end groups.

The formation of chemical bonds between polymer (PAS) and polymer (POS) still is encompassed by the scope of the present invention.

Articles and Applications

The present invention also relates to an article, part or composite material, comprising the composition (C) as described above. The article, part or composite material of the present invention find several uses in automotive applications, electric and electronic applications, and consumer goods.

According to a preferred embodiment, the article, part or composite material of the invention is molded from the composition (C) according to the invention by various molding methods such as injection molding, extrusion molding, compression molding, blow molding, and injection compression molding, preferably by injection molding and extrusion molding.

Furthermore, the article, part or composite material of the invention can be molded by a process of extrusion molding requiring a relatively high molding temperature and a long melt residence time, thanks to the flexibility, extremely high tensile elongation at break and high heat aging resistance of the composition (C).

Examples of articles produced by extrusion molding include round bars, square bars, sheets, films, tubes, and pipes. Applications include electrical insulating materials for motors such as water heater motors, air-conditioner motors, and drive motors, film capacitors, speaker diaphragms, recording magnetic tapes, printed board materials, printed board peripherals, semiconductor packages, trays for conveying semiconductors, process/release films, protection films, film sensors for automobiles, insulating tapes for wire cables, insulating washers in lithium ion batteries, tubes for hot water, cooling water, and chemicals, fuel tubes for automobiles, pipes for hot water, pipes for chemicals in chemical plants, pipes for ultrapure water and ultrapure solvents, pipes for automobiles, pipes for chlorofluorocarbons and supercritical carbon dioxide refrigerants, and workpiece-holding rings for polishers. Other examples include molded articles for coating motor coil wires in hybrid vehicles, electric vehicles, railways, and power plants; and molded articles for coating heat-resistant electric wires and cables for household electrical appliances, wire harnesses and control wires such as flat cables used for the wiring in automobiles, and winding wires of signal transformers and car-mounted transformers for communication, transmission, high frequencies, audios, and measurements.

Applications of molded articles obtained by injection molding include electrical equipment components such as generators, electric motors, potential transformers, current transformers, voltage regulators, rectifiers, inverters, relays, power contacts, switches, breakers, knife switches, multipole rods, and electrical component cabinets; electronic components such as sensors, LED lamps, connectors, sockets, resistors, relay cases, small switches, coil bobbins, capacitors, variable capacitor cases, optical pickups, radiators, various terminal boards, transformers, plugs, printed circuit boards, tuners, speakers, microphones, headphones, small motors, magnetic head bases, power modules, semiconductors, liquid crystals, FDD carriages, FDD chassis, motor brush holders, parabolic antennas, and computer-related components; domestic and office electric appliance components such as VTR components, TV components, irons, hair dryers, rice cooker components, microwave oven components, acoustic components, audio equipment components for audios, laserdiscs (registered trademark), and compact discs, illumination components, refrigerator components, air conditioner components, typewriter components, and word processor components; machine-related components such as office computer-related components, telephone set-related components, facsimile-related components, copier-related components, cleaning jigs, motor components, lighters, and typewriters: components of optical and precision instruments such as microscopes, binoculars, cameras, and watches; automobile and vehicle-related components such as alternator terminals, alternator connectors, IC regulators, potentiometer bases for light dimmers, various valves including exhaust gas valves, various pipes for fuels, exhaust systems, and air intake systems, ducts, turboducts, air intake nozzle snorkels, intake manifolds, fuel pumps, engine coolant joints, carburettor main bodies, carburettor spacers, exhaust gas sensors, coolant sensors, oil temperature sensors, brake pad wear sensors, throttle position sensors, crankshaft position sensors, air flow meters, brake pad wear sensors, thermostat bases for air-conditioners, warming hot air flow control valves, brush holders for radiator motors, water pump impellers, turbine vanes, windshield wiper motor-related components, distributors, starter switches, starter relays, transmission wire harnesses, window washer nozzles, air-conditioner panel switch boards, coils for fuel solenoid valves, fuse connectors, horn terminals, electric component insulators, step motor rotors, lamp sockets, lamp reflectors, lamp housings, brake pistons, solenoid bobbins, engine oil filters, and ignition cases; and gaskets for primary batteries and secondary batteries in cellular phones, notebook computers, video cameras, hybrid vehicles, and electric vehicles.

In particular, the composition (C) according to the invention is suitable for manufacturing cable coatings, cable ties and metal pipe coatings. More in particular, the composition (C) according to the invention is suitable for making molded articles for coating motor coil wires in hybrid vehicles, electric vehicles, railways, and power plants; and various pipes for fuels, exhaust systems, and air intake systems and ducts, in particular, turboducts in automobiles, which are exposed to high-temperature environments.

According to an embodiment, the articles of the present invention are 3D printed from the composition (C) of the invention, by a process comprising a step of extrusion of the material, which is for example in the form of a filament, or by a process comprising a step of laser sintering of the material, which is in this case in the form of a powder.

The composition (C) can therefore be in the form of a thread or a filament to be used in a process of 3D printing, e.g. Fused Filament Fabrication, also known as Fused Deposition Modelling (FDM), or continuous fiber printing (CF), or in the form of a powder to be used in a process of 3D printing, e.g. Selective Laser Sintering (SLS) and Multi Jet Fusion (MJF). The part material to be printed may comprise additional components, which are specific to 3D printing, e.g. fiber tows for continuous carbon fiber additive manufacturing, or e.g. a flow agent for SLS type printing process.

Accordingly, the composition (C) of the invention can be advantageously used for 3D printing applications.

The present invention also relates to a process for manufacturing a three-dimensional (3D) article, part or composite material, comprising:

a) depositing successive layers of a part material (M) comprising the composition (C) described herein, and
b) printing layers prior to deposition of the subsequent layer.

If the composition (C) is in the form of a powder, the process for manufacturing a 3D object may comprise selective sintering by means of an electromagnetic radiation of the powder.

If the composition (C) is in the form of a filament, the process for manufacturing a 3D object may comprise the extrusion of the filament.

Should the disclosure of any patents, patent applications, and publications which are incorporated herein by reference conflict with the description of the present application to the extent that it may render a term unclear, the present description shall take precedence.

The invention will now be described with reference to the following examples, whose purpose is merely illustrative and not intended to limit the scope of the invention.

EXPERIMENTAL SECTION

Materials

Ryton® QA200N PPS is a poly(phenylene sulfide) (PPS) commercially available from Solvay Specialty Polymers USA, LLC (PPS, hereinafter).

KF105 is a dual-end type/epoxy modified reactive silicone fluid of formula:

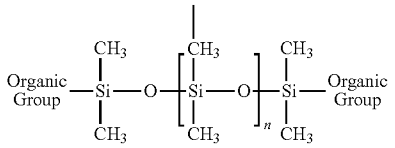

whereas organic group is

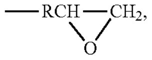

with R=H or $CH_3$, whereas n is such that the viscosity at 25 °C is 15 and the equivalent weight is 490 g/mol, commercially available from Shin-Etsu (KF105, hereinafter).

IRGANOX® 1010 is tetrakis [methylene-3-(3,5-di-tert-butyl-4-hydroxyphenyl-propionate)] methane, commercially available from BASF (1010, herein after)

IRGAFOS® 168 is Tris(2,4-di-tert.-butylphenyl)phosphite, commercially available from BASF (168, hereinafter)

Methods

DSC/Heat of Fusion

DSC analyses were carried out on a TA Q2000 Differential Scanning calorimeter according to ISO 11357 and data was collected through a two heat-one cool method. The protocol used is the following: 1st heat cycle from −10.00 °C to 320.00 °C at 10.00 °C/min; isothermal for 5 minutes; 1st cool cycle from 320.00 °C to −10.00 °C at 10.00 °C/min; 2nd heat cycle from −10.00 °C to 320.00 °C at 10.00 °C/min. The melting temperature ($T_m$) is recorded during the 2nd heat cycle and the melt crystallization temperature ($T_{mc}$) is recorded during the cool cycle.

Mechanical Properties

Tensile properties were determined at room temperature (23 °C) according to ISO 527-2 at a speed of 1 mm/min for Tensile Modulus and 5 mm/min for the rest of the experiment (ISO527-1A specimens) and ISO 179/1eA for impact properties.

Ageing Tests

The samples were heat aged in a re-circulating air oven (Thermo Scientific Heratherm OMH60) set at set-point temperature (150, 175 or 200 °C). At various heat ageing times (48 hours, 96 hours, 240 hours, 504 hours and 1008 hours), the samples were removed from the oven, allowed to cool to room temperature and placed into sealed aluminium lined bags until ready for testing. Mechanical properties were measured according to the same procedure as before ageing.

General Procedure for Making Compositions

To make these experiments, a dry blend is first realized and for each formulation, the targeted mass ratios of the components were mixed in a vibratory shaker for 2-3 minutes to assure homogeneity. The contents of the bucket was then placed in gravimetric feeder and fed into the extruder (Coperion ZSK 26 in Alpharetta and a Clextral D32 in Lyon), melted, and mixed with screws designed to achieve a homogeneous melt composition. Temperature during extrusion is controlled under 320 °C The melt stream was cooled and fed into a pelletizer. The pellets were collected and kept in sealed plastic buckets until used for injection molding. Specimens obtained from injection molding were tested for their mechanical properties as such ("DAM": dry-as-molded), and after aging, in the conditions listed in the tables below.

The ingredients and their reciprocal amounts in the compositions and the mechanical properties of the samples before and after air oven ageing are reported in Tables below.

TABLE 1

Formulations based on IRGAFOS ® 168

| Ingredient weight parts | Ex. 1C | Ex. 2C | Ex. 3 | Ex. 4 | Ex. 5 | Ex. 6 | Ex. 7C | Ex. 8C |
|---|---|---|---|---|---|---|---|---|
| PPS | 100 | 100 | 100 | 100 | 100 | 100 | 100 | 100 |
| KF105 | — | 1.5 | 1.5 | 1.5 | 1.5 | 1.5 | 1.5 | 1.5 |
| 168 | 1 | — | 0.05 | 0.1 | 0.2 | 0.3 | 0.5 | 1.0 |

TABLE 2

Mechanical properties on DAM specimens

| | Ex. 1C | Ex. 2C | Ex. 3 | Ex. 4 | Ex. 5 | Ex. 6 | Ex. 7C | Ex. 8C |
|---|---|---|---|---|---|---|---|---|
| Tensile Modulus (MPa)(*) | n.d. | 3819 ± 44 | 3655 ± 12 | 3618 ± 26 | 3618 ± 22 | 3665 ± 60 | 3849 ± 46 | 3972 ± 62 |
| Strain at break (%)(*) | n.d. | 16.46 ± 2.03 | 27.67 ± 2.73 | 28.24 ± 2.46 | 24.24 ± 3.23 | 28.03 ± 4.78 | 15.11 ± 4.46 | 12.06 ± 2.10 |
| Notched Charpy Impact | n.d. | 3.5 ± 0.4(**) | 3.3 ± 0.3 | 3.41 ± 0.31 | 3.53 ± 0.29 | 3.5 ± 0.4 | n.d. | n.d. |

(**)determined at 1 mm/m; ±standard deviation;

(**)determined on a specimen comprising 1.6 phr of KF105.

Mechanical properties on DAM specimens, as summarized above, are also sketched in graphical mode in FIG. 1; such graph well demonstrate that the addition of low amounts of compound (O), when combined with polymer (POS), is surprisingly effective in increasing significantly the flexibility, as represented by the strain at break values, while not significantly detrimentally affecting the mechanical strength (expressed by tensile modulus) nor the toughness (expressed by the Charpy impact).

Mechanical properties of specimens before and after aging at temperatures of 150 °C, 175 °C and 200 °C are summarized in Tables below.

TABLE 3

Tensile strain at break on DAM and aged specimens

| Tensile strain at break | | Ex. 1C value (%) | Ex. 1C retention | Ex. 2C value (%) | Ex. 2C retention | Ex. 4 value (%) | Ex. 4 retention |
|---|---|---|---|---|---|---|---|
| 150° C. | DAM | 7.12 | 100% | 27.9 | 100% | 27.93 | 100% |
| | 48 h | 6.76 | 95% | n.d. | n.d. | 21.6 | 77% |
| | 96 h | 5.13 | 72% | 9.95 | 36% | 22.78 | 82% |
| | 240 h | 4.77 | 67% | 9.6 | 34% | 25.2 | 90% |
| | 504 h | 5.1 | 72% | 8.69 | 31% | 20.27 | 73% |
| | 1008 h | 4.85 | 68% | n.d. | n.d. | 19.14 | 69% |
| 175° C. | DAM | 7.12 | 100% | n.d. | n.d. | 27.93 | 100% |
| | 48 h | 5.98 | 84% | n.d. | n.d. | 23.06 | 83% |
| | 96 h | 4.21 | 59% | n.d. | n.d. | 17.46 | 63% |
| | 240 h | 4.31 | 61% | n.d. | n.d. | 15.16 | 54% |
| | 504 h | 5.31 | 75% | n.d. | n.d. | 14.36 | 51% |
| | 1008 h | 3.04 | 43% | n.d. | n.d. | 11.92 | 43% |
| 200° C. | DAM | 7.12 | 100% | n.d. | 100% | 27.93 | 100% |
| | 48 h | 5.78 | 81% | n.d. | n.d. | 10.95 | 39% |
| | 96 h | 3.69 | 52% | n.d. | n.d. | 11.77 | 42% |
| | 240 h | 2.51 | 35% | n.d. | n.d. | 8.35 | 30% |
| | 504 h | 2.8 | 39% | n.d. | n.d. | 2.14 | 8% |
| | 1008 h | 1.38 | 19% | n.d. | n.d. | 1.4 | 5% |

| Tensile strain at break | | Ex. 7C value (%) | Ex. 7C retention | Ex. 8C value (%) | Ex. 8C retention |
|---|---|---|---|---|---|
| 150° C. | DAM | 15.11 | 100% | 12.06 | 100% |
| | 48 h | 16.95 | 112% | 12.69 | 105% |
| | 96 h | 13.94 | 92% | 10.29 | 85% |
| | 240 h | 9.21 | 61% | 9.06 | 75% |
| | 504 h | 9.17 | 61% | 7.06 | 59% |
| | 1008 h | 9.26 | 61% | 6.6 | 55% |
| 175° C. | DAM | 15.11 | 100% | 12.06 | 100% |
| | 48 h | 12.81 | 85% | 9.36 | 78% |
| | 96 h | 7 | 46% | 8.41 | 70% |
| | 240 h | 5.62 | 37% | 6.6 | 55% |
| | 504 h | 6.79 | 45% | 4.45 | 37% |
| | 1008 h | 4.3 | 28% | 3.13 | 26% |
| 200° C. | DAM | 15.11 | 100% | 12.06 | 100% |
| | 48 h | 8.27 | 55% | 4.36 | 36% |
| | 96 h | 4.08 | 27% | 6.53 | 54% |
| | 240 h | 4.4 | 29% | 3.26 | 27% |
| | 504 h | 2.12 | 14% | 1.57 | 13% |
| | 1008 h | 1.08 | 7% | 0.85 | 7% |

Figure 2:
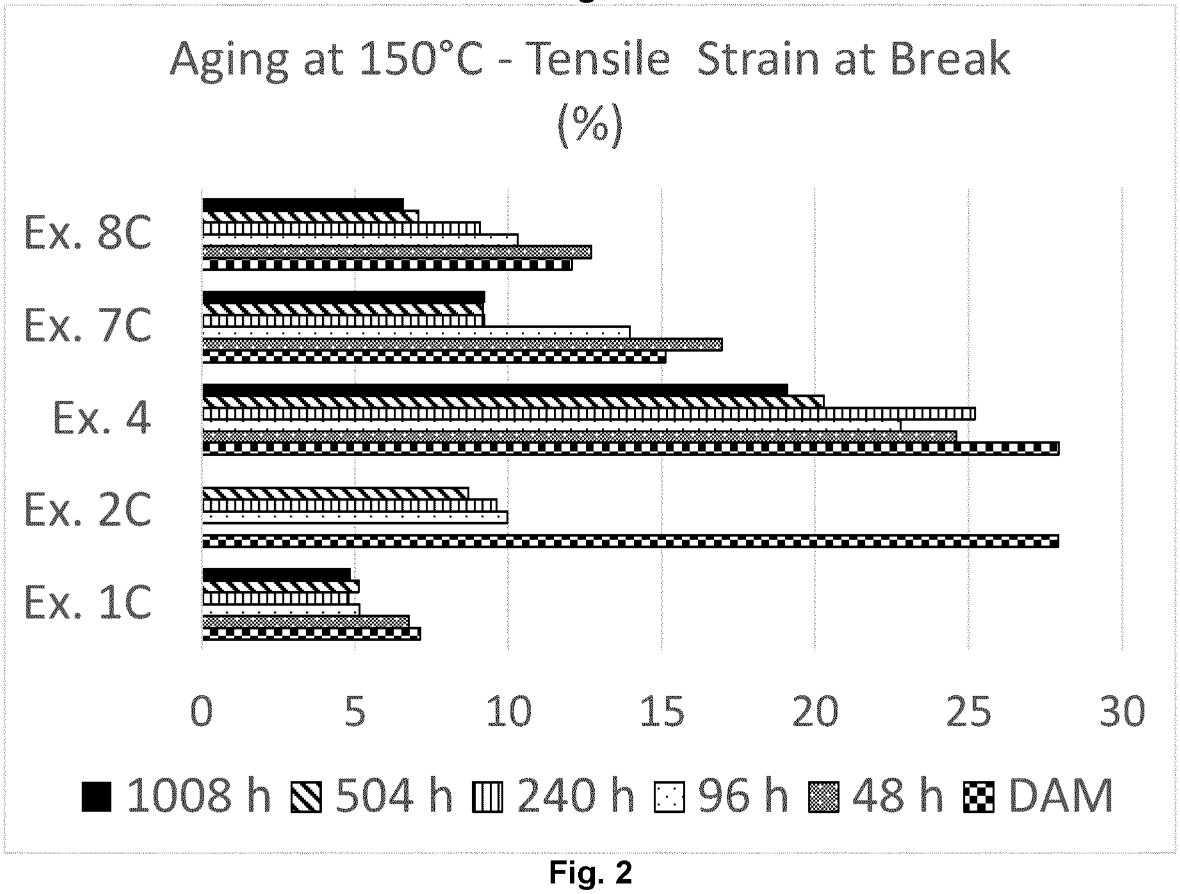
Figure 3:
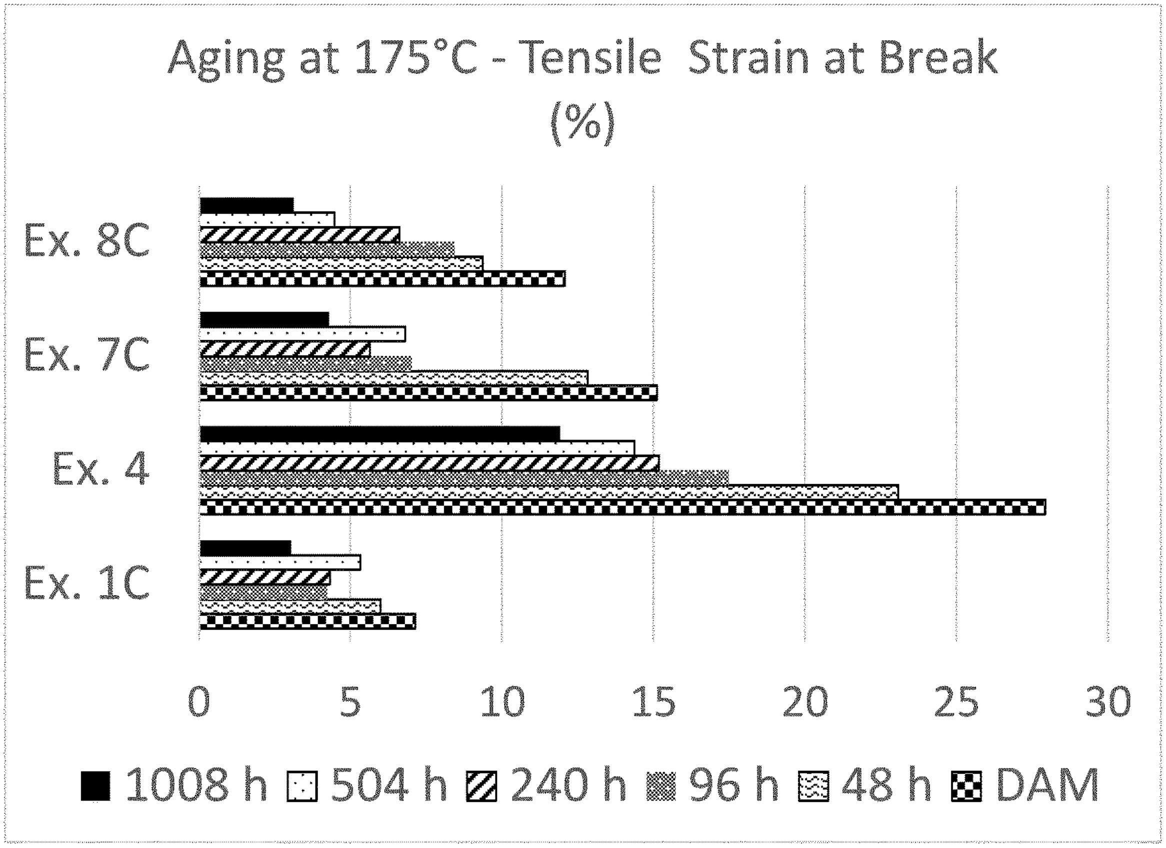
Figure 4:
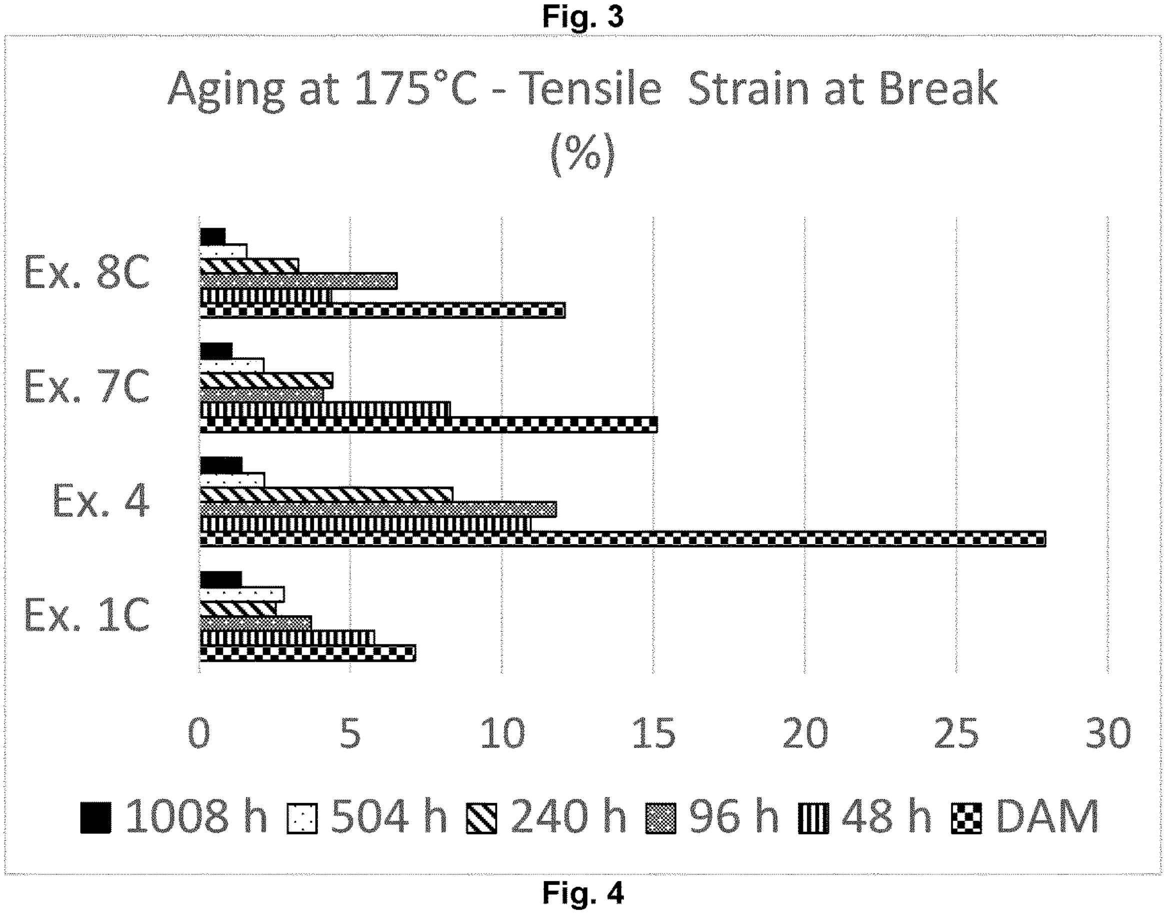

Retention of Tensile Strength at break upon aging at temperatures of 150°, 175°, and 200 °C is also sketched, in graphical mode, in FIGS. 2, 3 and 4. From those pictures, it is clearly shown that the use of compound (O), even at high concentrations (1% wt) is not effective in achieving retention of mechanical properties of PPS in the absence of polymer (POS). When polymer (POS) is present, a synergistic effect is achieved when low amounts of compound (O) are used (see Ex. 4), with optimized performances, which is totally unexpected.

TABLE 4

Formulations based on IRGANOX ® 1010

| Ingredient weight parts | Ex. 2C | Ex. 9C | Ex. 10 | Ex. 11C | Ex. 12C |
|---|---|---|---|---|---|
| PPS | 100 | 100 | 100 | 100 | 100 |
| KF105 | 1.5 | — | 1.5 | 1.5 | 1.5 |
| 1010 | — | 0.10 | 0.10 | 0.50 | 1.00 |

TABLE 2

Mechanical properties on DAM specimens

| | Ex. 2C | Ex. 10 | Ex. 11C | Ex. 12C |
|---|---|---|---|---|
| Tensile Modulus (MPa)(*) | 3819 ± 44 | 3712 ± 23 | 3910 ± 36 | 3994 ± 36 |
| Strain at break (%)(*) | 16.46 ± 2.03 | 25.41 ± 6.55 | 14.16 ± 1.81 | 130.58 ± 1.88 |

() determined at 1 mm/m; ±standard deviation; () determined on a specimen comprising 1.6 phr of KF105.

Mechanical properties on DAM specimens, as summarized above, confirm that, as already shown from FIG. 1, the addition of low amounts of compound (O), when combined with polymer (POS), is surprisingly effective in increasing significantly the flexibility, as represented by the strain at break values, while not significantly detrimentally affecting the mechanical strength (expressed by tensile modulus), while higher amounts of same compound (O) are such to detrimentally affect flexibility/toughening effect which is provided by the addition of polymer (POS)

TABLE 3

Tensile strain at break on DAM and aged specimens

| Tensile strain at break | | Ex. 9C value (%) | Ex. 9C retention | Ex. 10 value (%) | Ex. 10 retention | Ex. 11C value (%) | Ex. 11C retention |
|---|---|---|---|---|---|---|---|
| 150° C. | DAM | 4.93 | 100% | 25.41 | 100% | 14.16 | 100% |
| | 48 h | 4.37 | 89% | | | 12.62 | 89% |
| | 96 h | 3.47 | 70% | | | 11.45 | 81% |
| | 240 h | 3.04 | 62% | | | 10.57 | 75% |
| | 504 h | 3.46 | 70% | | | 9.76 | 69% |
| | 1008 h | 3.82 | 77% | | | 10.79 | 76% |
| 175° C. | DAM | 4.93 | 100% | 25.41 | 100% | 14.16 | 100% |
| | 48 h | 3.75 | 76% | | | 11.44 | 81% |
| | 96 h | 3.73 | 76% | | | 7.18 | 51% |
| | 240 h | 2.82 | 57% | | | 6.72 | 47% |
| | 504 h | 3.86 | 78% | | | 4.03 | 28% |
| | 1008 h | 3.31 | 67% | | | 4.52 | 32% |
| 200° C. | DAM | 4.93 | 100% | 25.41 | 100% | 14.16 | 100% |
| | 48 h | 3.39 | 69% | | | 5.42 | 38% |
| | 96 h | 3.19 | 65% | | | 5.41 | 38% |
| | 240 h | 1.86 | 38% | | | 4.23 | 30% |
| | 504 h | 1.86 | 38% | | | 1.26 | 9% |
| | 1008 h | 1.25 | 25% | | | 1.09 | 8% |

The data above show that the addition of large amounts of compound (O) in combination with polymer (POS) is not effective in achieving thermal stability, while low amounts of compound (O) have proven to be effective.

The invention claimed is:

1. A polymer composition [composition (C)] comprising at least one poly (arylene sulfide) polymer [polymer (PAS)] having amelt flow rate at 315.6 °C under a weight of 1.27 kg according to ASTM D1238, procedure B of at least 5 g/10 min and at most 200 g/10 min, and at least one polyorganosiloxane polymer [polymer (POS)]; and at least one antioxidant compound [compound (O)], in an amount of 0.03 to 0.4% wt, with respect to the weight of polymer (PAS);

wherein the polymer (PAS) consists essentially of recurring units ($R_{PAS1}$) represented by the following formula:

$$[-Ar_1-S—] \qquad (R_{PAS1})$$

wherein in formula ($R_{PAS1}$), $-Ar_1-$ is represented by any of the following formulae:

(a-1)

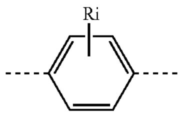

(a-2)

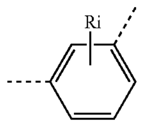

(a-3)

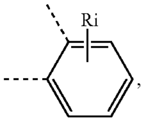

wherein:

R, at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group;

i, at each instance, is an independently selected integer from 0 to 4;

wherein the polymer (POS) complies with formula (II):

(II)

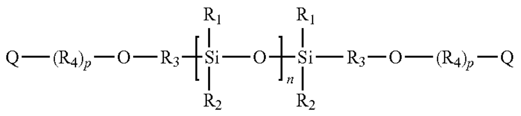

wherein:

each of Q;

$R_1$, $R_2$, $R_3$ and $R_4$, equal to or different from each other, are selected from $C_1$-$C_{10}$ alkyl groups and $C_6$-$C_{10}$ aromatic groups, n varies between 2 and 70, and p is zero or 1, and wherein the compound (O) is selected from the group consisting of:

hindered phenol compounds selected from the group consisting of (d1)

tetrakis (methylene-3-(3,5-di-tert-butyl-4-hydroxyphenyl) propionate)methane, (d2) Thiodiethylene bis [3-(3,5-di-tert.-butyl-4-hydroxy-phenyl)propionate], (d3) Octadecyl-3-(3,5-di-tert.butyl-4-hydroxyphenyl)-propionate, and (d4) N,N'-hexane-1,6-diylbis(3-(3,5-di-tert.-butyl-4-hydroxyphenylpropionamide)); and phosphite esters selected from the group consisting of (e3) Tris(2,4-di-tert.-butylphenyl) phosphite; (e5) Bis(2,4-di-tert-butylphenol) pentaerythritol diphosphate;

(e6) Bis(2,6-di-ter-butyl-4-methylphenyl)pentaerythritol-diphosphite; (e8) bis(2,4-di-tert-butyl-6-methyl phenyl) ethyl phosphite.

2. The composition (C) according to claim 1, wherein polymer (PAS) is a poly (phenylene sulfide) (PPS) polymer having units ($R_{PAS1}$) of formula (a1)

where i is zero, and optionally additionally comprising units of any of formulae:

($R_{PPS-m}$)

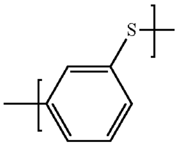

($R_{PPS-o}$)

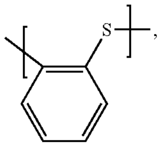

being understood that when polymer (PPS) further comprises units ($R_{PPS-m}$) and/or ($R_{PPS-0}$), the total concentration of recurring units ($R_{PPS-m}$) and/or ($R_{PPS-0}$) in the polymer (PPS) is at most 10 mol %, based on total amount of units ($R_{PPS}$), ($R_{PPS-m}$) and ($R_{PPS-0}$).

3. The composition (C) according to claim 1, wherein the polymer (POS) comprises a plurality of epoxy functional groups; and wherein said at least one epoxy functional group may be comprised in polymer (POS) as a pendant group in a recurring unit, or may be comprised as chain ends.

4. The composition (C) according to claim 1, wherein the polymer (POS) complies with formula (III):

(III)

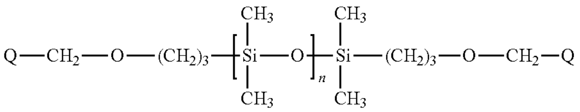

wherein:

each of Q is an epoxy group; and n varies between 2 and 70.

5. The composition (C) according to claim 1, wherein the polymer (PAS) has a weight-average molecular weight of 40,000 to 120,000 g/mol.

6. The composition (C) according to claim 1, wherein the polymer (PAS) has a melt flow rate at 315.6 °C, under a weight of 1.27 kg according to ASTM D1238, procedure B of at least 15 g/10 min and at most 35 g/10 min.

7. The composition (C) according to claim 1, wherein the polymer (PAS) has a weight-average molecular weight of 55,000 to 90,000 g/mol.

8. The composition (C) according to claim 1, wherein the compound (O) is selected from the group consisting of tetrakis(methylene-3-(3,5-di-tert-butyl-4-hydroxyphenyl) propionate) methane; tris(2,4-di-tert.-butylphenyl)phosphite; and mixtures thereof.

9. A polymer composition (C) comprising:

at least one poly(arylene sulfide) polymer, polymer (PAS), consisting essentially of recurring units ($R_{PAS1}$) represented by the following formula:

[-$Ar_1$-S—] ($R_{PAS1}$)

wherein in formula ($R_{PAS1}$), -$Ar_1$- is represented by any of the following formulae:

(a-1)

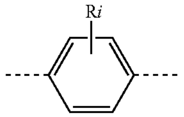

(a-2)

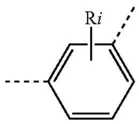

(a-3)

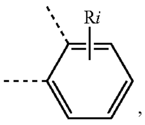

, wherein:

R, at each instance, is independently selected from the group consisting of a $C_1$-$C_{12}$ alkyl group, a $C_7$-$C_{24}$ alkylaryl group, a $C_7$-$C_{24}$ aralkyl group, a $C_6$-$C_{24}$ arylene group, and a $C_6$-$C_{18}$ aryloxy group;

i, at each instance, is an independently selected integer from 0 to 4; and at least one polyorganosiloxane polymer, polymer (POS), wherein polymer (POS) complies with formula (II):

(VI)

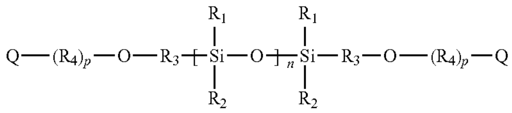

wherein:

each of Q is an epoxy group;

$R_1$, $R_2$, $R_3$ and $R_4$, equal to or different from each other, are selected from $C_1$-$C_{10}$ alkyl groups and $C_6$-$C_{10}$ aromatic groups, n varies between 2 and 70, and p is zero or 1; and at least one antioxidant compound, compound (O), selected from the group consisting of tetrakis(methylene-3-(3,5-di-tert-butyl-4-hydroxyphenyl) propionate) methane;

tris(2,4-di-tert.-butylphenyl)phosphite; and mixtures thereof; wherein compound (O) is in an amount of 0.03 to 0.4% wt, with respect to the weight of polymer (PAS).

* * * * *